(12) United States Patent
Shichino

(10) Patent No.: US 10,601,262 B2
(45) Date of Patent: *Mar. 24, 2020

(54) POWER RECEIVING APPARATUS, METHOD FOR CONTROLLING POWER RECEIVING APPARATUS, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,838

(22) Filed: Apr. 3, 2017

(65) Prior Publication Data

US 2017/0207649 A1    Jul. 20, 2017

Related U.S. Application Data

(63) Continuation of application No. 14/450,084, filed on Aug. 1, 2014, now Pat. No. 9,641,018.

(30) Foreign Application Priority Data

Aug. 5, 2013    (JP) .................. 2013-162231

(51) Int. Cl.
*H02J 50/80*    (2016.01)
*H02J 7/00*    (2006.01)
*H02J 50/00*    (2016.01)
*H02J 7/02*    (2016.01)

(52) U.S. Cl.
CPC ............ *H02J 50/80* (2016.02); *H02J 7/0004* (2013.01); *H02J 7/0008* (2013.01); *H02J 7/0022* (2013.01); *H02J 7/0024* (2013.01); *H02J 7/0055* (2013.01); *H02J 7/0081* (2013.01); *H02J 7/0083* (2013.01); *H02J 50/00* (2016.02); *H02J 2007/005* (2013.01)

(58) Field of Classification Search
CPC ...... H02J 2007/005; H02J 50/00; H02J 50/80; H02J 7/0004; H02J 7/0008; H02J 7/0022; H02J 7/0024; H02J 7/0055; H02J 7/0081; H02J 7/0083; H02J 7/025; H02J 7/00; H02J 7/02

See application file for complete search history.

(56) References Cited

U.S. PATENT DOCUMENTS

| | | | | |
|---|---|---|---|---|
| 9,641,018 B2* | 5/2017 | Shichino | ................. | H02J 7/025 |
| 2009/0271047 A1* | 10/2009 | Wakamatsu | ............ | H02J 5/005 |
| | | | | 700/295 |
| 2011/0148510 A1* | 6/2011 | Dhuyvetter | ............. | H02M 3/07 |
| | | | | 327/536 |
| 2012/0149307 A1* | 6/2012 | Terada | .................... | H02J 7/025 |
| | | | | 455/66.1 |
| 2013/0146580 A1* | 6/2013 | Saijo | ........................ | F27B 5/14 |
| | | | | 219/388 |

* cited by examiner

*Primary Examiner* — Vuthe Siek

(74) *Attorney, Agent, or Firm* — Canon U.S.A., Inc. IP Division

(57) ABSTRACT

A power receiving apparatus receives power wirelessly transmitted by a power transmission apparatus, and stores the received power. The power receiving apparatus includes a communication unit configured to transmit and receive a control signal in a wireless power transmission system. The power receiving apparatus switches a supply source of power to the communication unit when a power storage capacity is less than a threshold value.

21 Claims, 23 Drawing Sheets

FIG.4

| | POWER RECEIVING STATE 400 | STATE WHERE THERE IS NO REMAINING BATTERY CAPACITY 401 | SUPPLY POWER TO BLE 402 | Vrx SIGNAL 403 | Vbat SIGNAL 404 |
|---|---|---|---|---|---|
| 405 | 0 | 1 | — | Lo | Lo |
| 406 | 1 | 1 | FIRST CONSTANT VOLTAGE CIRCUIT | Hi | Lo |
| 407 | 1 | 0 | BATTERY | Lo | Hi |
| 408 | 0 | 0 | BATTERY | Lo | Hi |

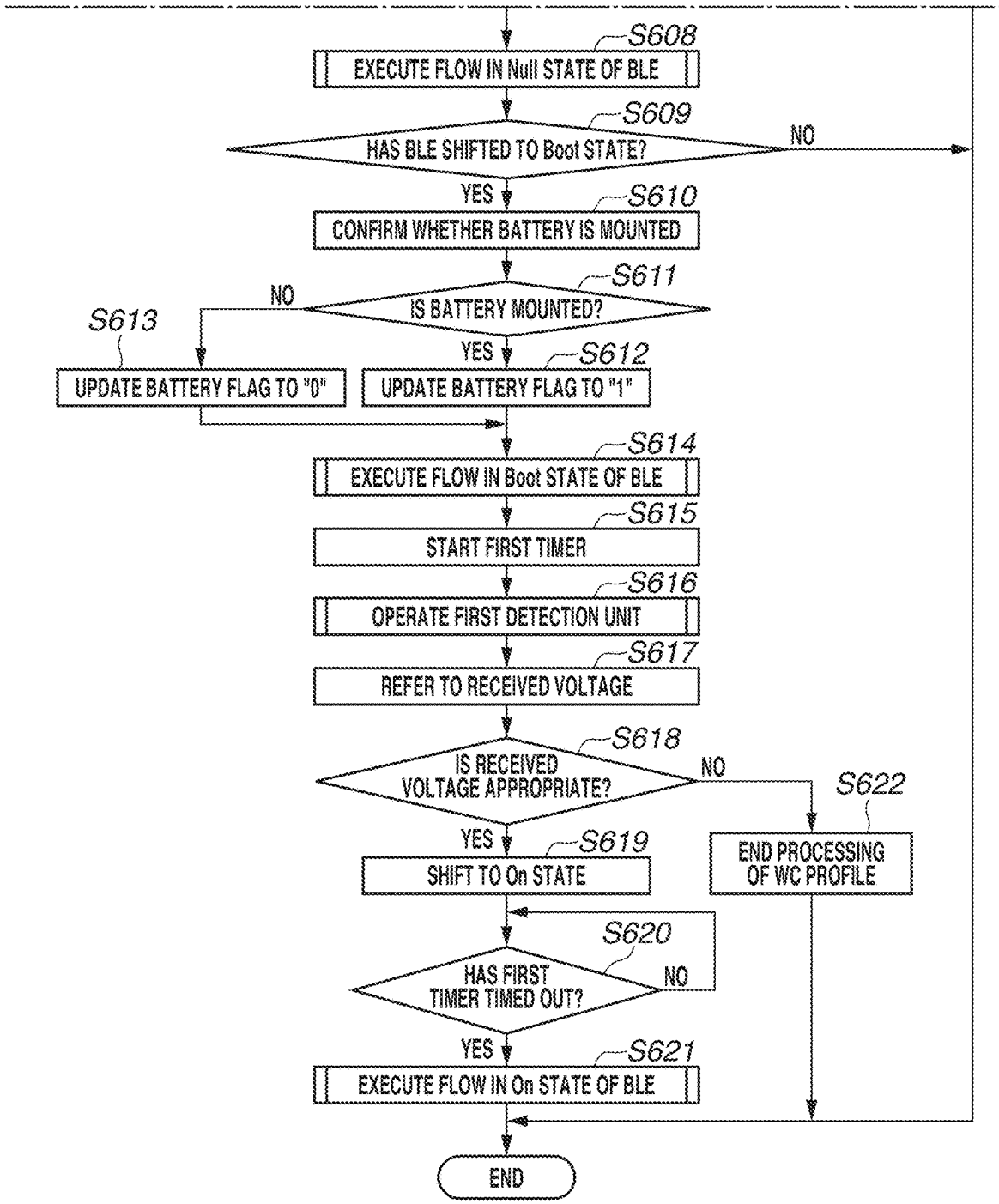

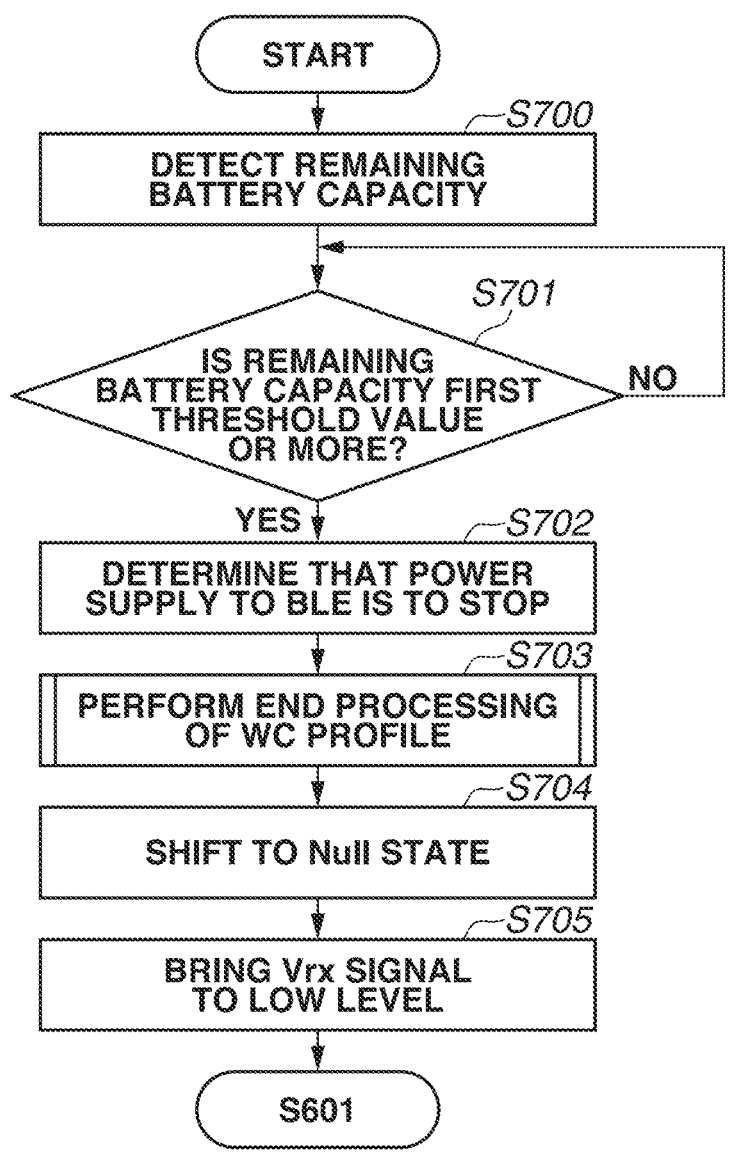

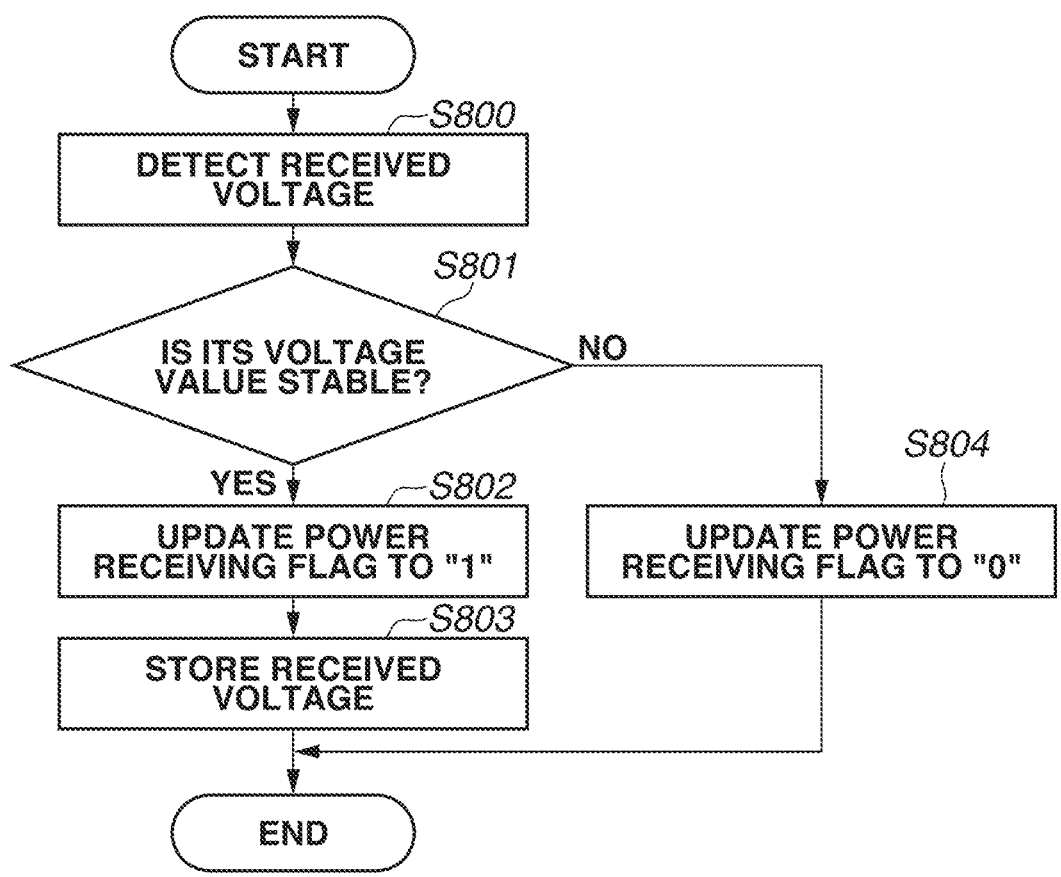

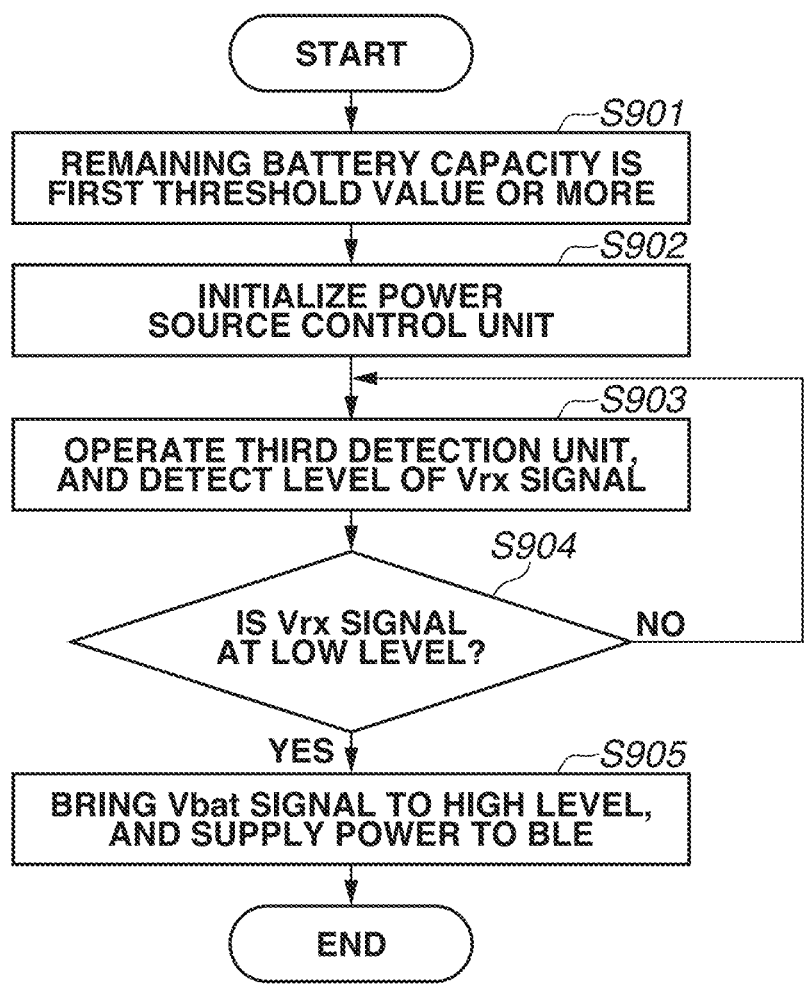

FIG.15

| POWER RECEIVING FLAG *1500* | RECEIVED VOLTAGE *1501* | BATTERY FLAG *1502* |
|---|---|---|
| 1 | 5V | 1 |

FIG.19A BATTERY OF CAMERA xxx IS NOT MOUNTED.

FIG.19B CONFIRM WHETHER BATTERY OF CAMERA xxx IS CORRECTLY MOUNTED.

FIG.19C REMAINING BATTERY CAPACITY OF CAMERA xxx IS 50%.

FIG.19D CHARGING OF CAMERA xxx IS COMPLETED.

FIG.19E CAMERA xxx IS BEING CHARGED. REMAINING BATTERY CAPACITY IS 50%.

POWER RECEIVING APPARATUS, METHOD FOR CONTROLLING POWER RECEIVING APPARATUS, AND STORAGE MEDIUM

CROSS-REFERENCE TO RELATED APPLICATIONS

This application is a Continuation of U.S. patent application Ser. No. 14/450,084 filed on Aug. 1, 2014, which claims the benefit of Japanese Patent Application No. 2013-162231 filed Aug. 5, 2013. These applications are hereby incorporated by reference herein in their entirety.

BACKGROUND

Field

Aspects of the present invention generally relate to a power receiving apparatus in a wireless power transmission system that wirelessly transmits power from a power transmission apparatus to the power receiving apparatus.

Description of the Related Art

A technique for a wireless power transmission system including a power transmission apparatus and a power receiving apparatus has widely been developed. Japanese Patent Application laid-Open No. 2007-088658 discusses an electronic apparatus including a power receiving unit, a power storage unit, and a wireless communication unit by wireless power transmission, and discusses a configuration in which an operating power to the wireless communication unit is switched from the power receiving unit to the power storage unit if a received voltage of the power receiving unit is a threshold value or less.

The power receiving apparatus needs to have a function of charging a battery even when there is no remaining battery capacity.

However, in the configuration discussed in Japanese Patent Application Laid-Open No. 2007-088658, the wireless communication unit cannot operate when there is no remaining battery capacity. Thus, the power storage unit cannot be charged by wireless power transmission. A control method for causing a communication unit to be controlled from a plurality of control units (a first central processing unit (CPU) and a second CPU) to appropriately operate also needs to be implemented.

SUMMARY

Aspects of the present invention are generally directed to implementing a power receiving apparatus capable of charging a battery by wireless power transmission even if there is no remaining battery capacity, or a convenient power receiving apparatus that appropriately operates even if a communication unit is controlled from a plurality of control units.

According to an aspect of the present invention, a power receiving apparatus includes a power receiving unit configured to receive power wirelessly transmitted by a power transmission apparatus, a power storage unit configured to store the power received by the power receiving unit, a communication unit configured to transmit and receive a control signal in a wireless power transmission system, and a switching unit configured to switch a supply source of power to the communication unit, wherein the switching unit switches the supply source to the power receiving unit when a power storage capacity of the power storage unit is less than a threshold value.

Further features of the present disclosure will become apparent from the following description of exemplary embodiments with reference to the attached drawings.

BRIEF DESCRIPTION OF THE DRAWINGS

FIG. 4 illustrates a correspondence between a state of the power receiving apparatus and a supply source of power to a Bluetooth® Low Energy (BLE).

FIG. 7 is a flowchart applicable to processing of the first switching unit by the first CPU.

FIG. 8 is a flowchart applicable to a first detection unit.

FIG. 9 is a flowchart applicable to a power source control unit.

FIG. 10 is a flowchart of the BLE after power thereto is turned on.

FIG. 15 illustrates a portion, relating to charging processing, of a first storage unit.

FIGS. 19A, 19B, 19C, 19D, and 19E illustrate examples of display on the display unit in the power transmission apparatus.

DESCRIPTION OF THE EMBODIMENTS

Various exemplary embodiments will be described in detail below with reference to the drawings.

Figure 1:
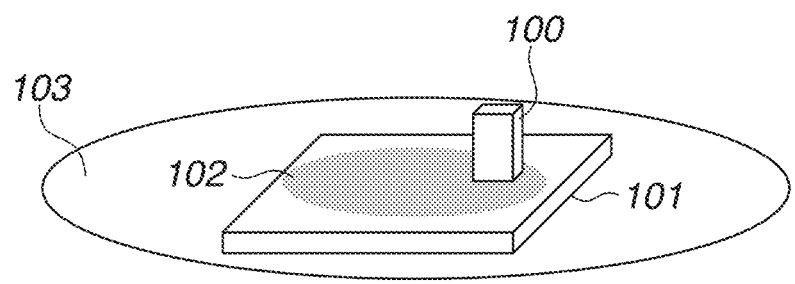
FIG. 1 illustrates a system configuration applicable to the present disclosure.

FIG. 1 illustrates a configuration of a wireless power transmission system applicable to the present disclosure. The wireless power transmission system includes an electronic apparatus 100 including a power receiving function, and a power transmission apparatus 101. A gray circle indicates a range 102 where the power transmission apparatus 101 can transmit power (a transmittable range 102). A circle represents a range 103 where a control signal, to be transmitted by the power transmission apparatus 101, in the wireless power transmission system can reach (a communicable range 103). FIG. 1 indicates that the electronic apparatus 100 including the power receiving function exists in the transmittable range 102 and exists in the communicable range 103.

Figure 2:
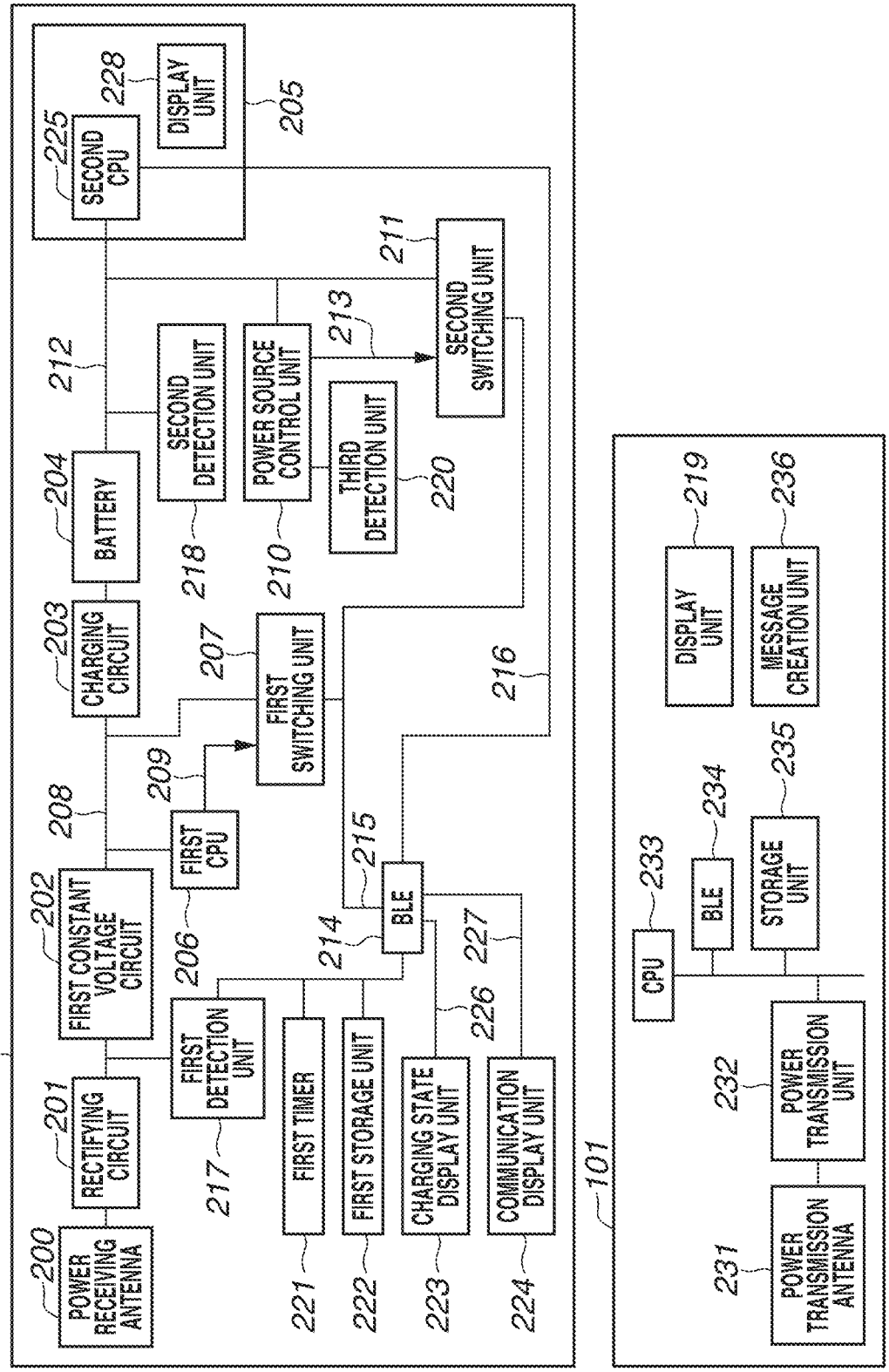
FIG. 2 is a block diagram of a power transmission apparatus and a power receiving apparatus applicable to the present disclosure.

FIG. 2 is a block diagram illustrating the power transmission apparatus 101 and the electronic apparatus 100 including the power receiving function, which are applicable to the present disclosure.

The power transmission apparatus 101 and the electronic apparatus 100 including the power receiving function wirelessly transmit power between a power transmission antenna 231 and a power receiving antenna 200. A rectifying circuit 201 converts an alternating current (AC) voltage having a frequency of 6.78 MHz, which has been received by the power receiving antenna 200, into a direct current (DC) voltage. A first constant voltage circuit 202 converts the level of the DC voltage output by the rectifying circuit 201 into a voltage level at which another circuit block including a first CPU 206 can operate.

A control signal used to control the wireless power transmission is transmitted and received between a Bluetooth® Low Energy (BLE) standard 234 serving as a communication unit in the power transmission apparatus 101 and a BLE 214 serving as a communication unit in the electronic apparatus 100 including the receiving function.

For the BLE 214 in the electronic apparatus 100 including the power receiving function and the BLE 234 in the power transmission apparatus 101 to transmit and receive the control signal for the wireless power transmission, an application program for controlling the BLE 214 and the BLE 234 is defined as a wireless charging (WC) profile in the present exemplary embodiment.

A charging circuit 203 stores an output 208 of the first constant voltage circuit 202 as a supply power in a battery 204. A circuit block 205, which operates upon being supplied with the power from the battery 204, in the electronic apparatus 100 is a circuit block such as a smartphone. The circuit block 205 in the electronic apparatus 100 includes at least a display unit 228 and a second CPU 225. For simplicity, the electronic apparatus 100 including the power receiving function and the circuit block 205 in the electronic apparatus 100 are respectively hereinafter referred to as a power receiving apparatus 100 and an electronic apparatus 205.

The second CPU 225 controls an operation of the electronic apparatus 205. The second CPU 225 controls the BLE 214 via an interface 216 to execute an application mounted on the electronic apparatus 205 and communicates with another electronic apparatus (not illustrated). The interface 216 includes a universal asynchronous receiver transmitter (UART) interface or a secure digital input output (SDIO) interface. More specifically, the BLE 214 is controlled by the first CPU 206 to transmit and receive the control signal for the wireless power transmission and executes a WC profile, while the BLE 214 is controlled by the second CPU 225 as well to execute the application mounted on the electronic apparatus 205.

A first switching unit 207 is a switch for switching whether to connect the output 208 of the first constant voltage circuit 202 to a power 215 to the BLE 214 depending on the voltage level of a Vrx signal 209 output by the first CPU 206. More specifically, if the Vrx signal 209 is at a high level (e.g., 3.3 bolts), the output 208 of the first constant voltage circuit 202 and the power 215 to the BLE 214 are connected to each other. If the Vrx signal 209 is at a low level (e.g., 0 bolt), the output 208 of the first constant voltage circuit 202 and the power 215 to the BLE 214 are not connected to each other. The power 215 is used for the BLE 214 to operate. More specifically, the BLE 214 operates upon being supplied with power from the output 208 of the first constant voltage circuit 202 when the Vrx signal 209 is at a high level.

A power source control unit 210 operates upon being supplied with power from an output 212 of the battery 204, and outputs a Vbat signal 213 to a second switching unit 211, described below.

The second switching unit 211 is a switch for switching whether the output 212 of the battery 204 is connected to the power 215 to the BLE 214 depending on a voltage level of the Vbat signal 213 output by the power source control unit 210. More specifically, if the Vbat signal 213 is at a high level (e.g., 3.3 bolts), the output 212 of the battery 204 and the power 215 to the BLE 214 are connected to each other. If the Vbat signal 213 is at a low level (e.g., 0 bolt), the output 212 of the battery 204 and the power 215 to the BLE 214 are not connected to each other. More specifically, the BLE 214 operates upon being supplied with the power from the output 212 of the battery 204 when the Vbat signal 213 is at a high level.

A first detection unit 217 detects the DC voltage output by the rectifying circuit 201, and determines a voltage value of the output DC voltage and whether the voltage value is stable. The second detection unit 218 detects a voltage value of the output 212 of the battery 204 or a remaining battery capacity of the battery 204.

A third detection unit 220 detects the voltage level of the Vrx signal 209 output by the first CPU 206.

A first timer 221 sets a time interval at which connection processing is performed for the BLE 234 in the power transmission apparatus 101 when the BLE 214 in the power receiving apparatus 100 executes the above-mentioned WC profile. More specifically, if one second is set in the first timer 221, the BLE 214 performs the connection processing for the BLE 234 for each second.

While a first storage unit 222 stores information required to operate the power receiving apparatus 100, details thereof will be described below. A charging state display unit 223 displays, when a state of the power receiving apparatus 100 is an On state, the On state of the power receiving apparatus 100. For example, the charging state display unit 223 is configured to include a light emitting diode (LED), and control is performed so that the BLE 214 in the power receiving apparatus 100 brings a signal 226 to a high level to make the LED light up. A communication display unit 224 brings a signal 227 to a high level to make the LED to light up when the electronic apparatus 205 uses the BLE 214 using an application program other than the WC profile.

A power transmission unit 232 applies an AC voltage to the power transmission antenna 231. A storage unit 235 stores an identifier of the power receiving apparatus 100 or the BLE 214 in the WC profile and a state of the BLE 214 in the power receiving apparatus 100 in the WC profile. A message creation unit 236 creates a message about a power receiving state of the power receiving apparatus 100 based on information received via the BLE 234 and a state of the power receiving apparatus 100 stored in the storage unit 235. A display unit 219 displays the information created by the message creation unit 236. A CPU 233 controls the whole power transmission apparatus 101.

Figure 21:
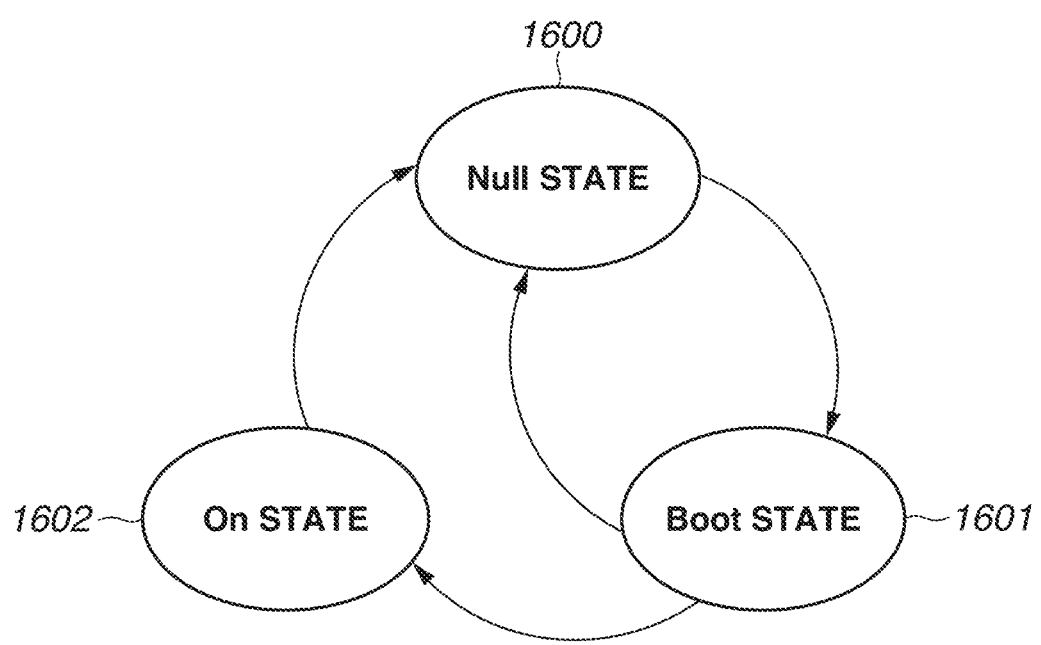
FIG. 21 illustrates a state transition of the power receiving apparatus.

FIG. 21 illustrates a state transition of the power receiving apparatus 100 according to the present exemplary embodiment. The power receiving apparatus 100 has three states, a Null state 1600, a Boot state 1601, and an On state 1602. The Null state 1600 is a state where the power receiving apparatus 100 does not receive power. The Boot state 1601 is a state where BLE connection is established between the power receiving apparatus 100 and the power transmission apparatus 101. The On state 1602 is a state where power is transmitted.

Figure 3:
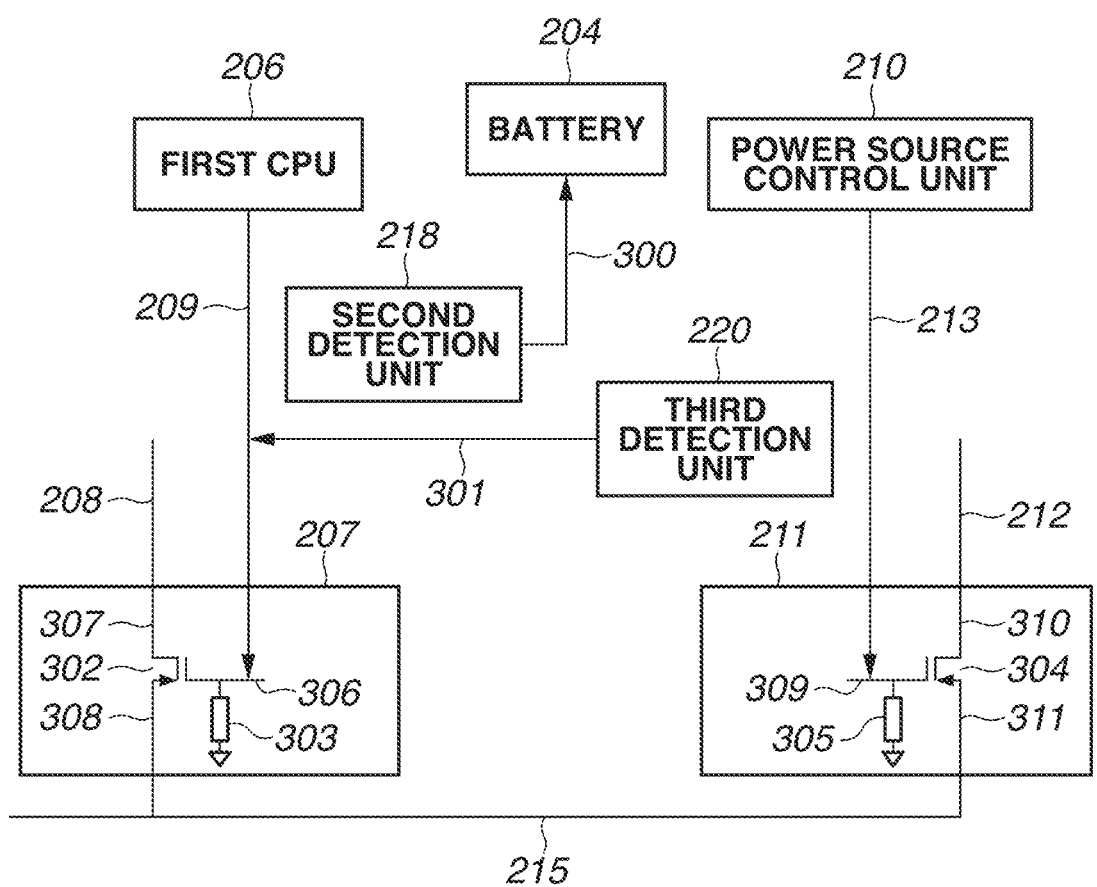
FIG. 3 schematically illustrates operations of a first switching unit and a second switching unit.

FIG. 3 illustrates respective operations of the first switching unit 207 and the second switching unit 211. Either one of the first switching unit 207 and the second switching unit 211 connects one of the output 208 of the first constant voltage circuit 202 and the output 212 of the battery 204 to the power 215 to the BLE 214. It is important that the first switching unit 207 and the second switching unit 211 are not to simultaneously output the output 208 of the first constant voltage circuit 202 and the output 212 of the battery 204 to the power 215. The first constant voltage circuit 202 has a capability to supply an operating power (e.g., 3.3 volts) to the BLE 214, and the battery 204 also has a capability to supply the operating power. When both the first constant voltage circuit 202 and the battery 204 simultaneously provide the operating power, therefore, a voltage that is two times the operating power may be applied to the BLE 214. Alternatively, respective voltages output by the first constant voltage circuit 202 and the battery 204 are not at entirely the same voltage level due to a variation in performance among electronic components constituting the first constant voltage circuit 202 and the battery 204. If the first switching unit 207 and the second switching unit 211 simultaneously supply power to the BLE 214, a reverse current may flow through one having the lower voltage level of the first constant voltage circuit 202 and the battery 204.

An arrow 300 indicates that the second detection unit 218 detects a voltage value of the voltage output by the battery 204. The first switching unit 207 includes, for example, an N-channel metal oxide semiconductor field effect transistor (MOSFET) (hereinafter referred to as a FET) 302 and a fixed resistor 303. The FET 302 has its gate terminal 306 connected to the Vrx signal 209, and its drain terminal 307 connected to the output 208 of the first constant voltage circuit 202. A source terminal 308 is connected to the power 215 to the BLE 214.

The operation of the first switching unit 207 will be described. The fixed resistor 303 is a pull-down resistor for pulling down its gate terminal 306 to a ground level. If the power receiving apparatus 100 does not receive power, and the first CPU 206 stops, the level of the Vrx signal 209 becomes unstable. However, due to the fixed resistor 303, a voltage level of the gate terminal 306 becomes low, and the FET 302 is off. Accordingly, the output 208 of the first constant voltage circuit 202 and the power 215 to the BLE 214 are not connected to each other.

If the power receiving apparatus 100 receives power, and the first CPU 206 is operating, the second detection unit 218 detects a remaining battery capacity (a power storage capacity). The first CPU 206 determines whether the remaining battery capacity is not less than a battery capacity (e.g., a first threshold value) at which at least the power source control unit 210 and the BLE 214 can operate. If the remaining battery capacity is less than the first threshold value, as a result of the determination, so that it is determined that the power source control unit 210 is not operating, and thus the output 212 of the battery 204 is not connected to the operating power to the BLE 214, the Vrx signal 209 is brought to a high level to turn on the FET 302. Thus, the output 208 of the first constant voltage circuit 202 is connected to the power 215 to the BLE 214 to operate the BLE 214.

If the remaining battery capacity is the first threshold value or more as a result of the determination, it is determined that the power source control unit 210 is operating and the output 212 of the battery 204 is connected to the operating power to the BLE 214. The Vrx signal 209 is brought to a low level to turn off the FET 302, and not to connect the output 208 of the first constant voltage circuit 202 to the operating power to the BLE 214. Thus, if the operating power to the BLE 214 is not supplied from the battery 204, the first CPU 206 supplies the operating power from the first constant voltage circuit 202 to operate the BLE 214. On the other hand, if the operating power to the BLE 214 is supplied from the battery 204, the CPU 206 does not supply the power 215 from the first constant voltage circuit 202.

The operation of the second switching unit 211 will be described below.

An arrow 301 indicates that the third detection unit 220 detects a voltage value of the Vrx signal 209. The second switching unit 211 includes an FET 304 and a fixed resistor 305. The FET 304 has its gate terminal 309 connected to the Vbat signal 213 and its drain terminal 310 connected to the output 212 of the battery 204. A source terminal 311 is connected to the power 215 to the BLE 214.

The fixed resistor 305 is a pull-down resistor for pulling down the gate terminal 309 to a ground level. If the power source control unit 210 stops while there is no remaining battery capacity, the level of the Vbat signal 213 becomes unstable. However, due to the fixed resistor 305, a voltage level of the gate terminal 309 becomes low, and the FET 304 is off. Accordingly, the output 212 of the battery 204 and the power 215 to the BLE 214 are not connected to each other.

If the power source control unit 210 is operating while there is remaining battery capacity, the third detection unit 220 detects the voltage value of the Vrx signal 209. The power source control unit 210 determines whether the level of the voltage value is high. If the level of the voltage value is low, as a result of the determination, so that it is determined that the output 208 of the first constant voltage circuit 202 is not connected to the operating power to the BLE 214, the Vbat signal 213 is brought to a high level to turn on the FET 304. Thus, the output 212 of the battery 204 is connected to the power 215 to the BLE 214.

If the Vrx signal 209 is at a high level as a result of the determination, it is determined that the first CPU 206 is operating with received power and the output 208 of the first constant voltage circuit 202 is connected to the operating power to the BLE 214. The Vbat signal 213 is brought to a low level to turn off the FET 304 and not to connect the output 212 of the battery 204 to the operating power to the BLE 214. Thus, if the operating power to the BLE 214 is not supplied from the first constant voltage circuit 202, the power source control unit 210 supplies the operating power from the battery 204. On the other hand, if the operating power to the BLE 214 is supplied from the first constant voltage circuit 202, the power source control unit 210 does not supply the power 215 from the battery 204.

As described above, if the first CPU 206 is operating (i.e., power is received) and the power source control unit 210 is not operating (there is no remaining battery capacity), the first CPU 206 controls the first switching unit 207 to supply power to the BLE 214. Thus, the BLE 214 can communicate with the BLE 234 in the power transmission apparatus 101 using the WC profile even if there is no remaining battery capacity. And, the battery 204 can be charged. The power source control unit 210 controls the second switching unit 211 to supply power to the BLE 214, if there is remaining battery capacity. Thus, the electronic apparatus 205 can communicate with another communication apparatus (not illustrated) via the BLE 214 using an application other than the WC profile in both a case where the power receiving apparatus 100 receives power and a case where the power receiving apparatus 100 does not receive power. One of the first CPU 206 and the power source control unit 210 determines whether the other supplies power to the BLE 214 to perform control so that power is supplied if the other does not supply the power and is not supplied if not. Thus, the output 208 of the first constant voltage circuit 202 and the output 212 of the battery 204 are prevented from being simultaneously connected to the power 215 to the BLE 214.

FIG. 4 illustrates a correspondence between a state of the power receiving apparatus 100 and a supply source of the power 215 to the BLE 214. A power receiving state 400 is "1" if power is received and "0" if not. A state 401 where there is no remaining battery capacity is "1" if there is no remaining battery capacity, and "0" if not (i.e., at least the power source control unit 210 operates). A supply source 402 supplies the power 215 to the BLE 214. A voltage level 403 of the Vrx signal 209 and a voltage level 404 of the Vbat signal 213 are used to implement the supply source 402.

A state 405 indicates that the power receiving apparatus 100 does not receive power (the power receiving state 400 is "0") and there is no remaining battery capacity (the state 401 where there is no remaining battery capacity is "1"). In the state 405, charging using the WC profile and the application mounted on the electronic apparatus 205 do not use the BLE 214. Accordingly, the supply source 402 of the power 215 to the BLE 214 is "–". "–" indicates that the supply source 402 is not defined. Both the voltage level 403 of the Vrx signal 209 and the voltage level 404 of the Vbat signal 213 are "Lo" due to respective pull-down effects of the fixed resistors 303 and 305.

A state 406 indicates that the power receiving apparatus 100 receives power (the power receiving state 400 is "1") and there is no remaining battery capacity (the state 401 where there is no remaining battery capacity is "1"). In the state 406, the BLE 214 charges the battery 204 using the WC profile. Since there is no remaining battery capacity, the application mounted on the electronic apparatus 205 does not use the BLE 214. Accordingly, the supply source 402 to the BLE 214 is to be a "first constant voltage circuit". The first constant voltage circuit 202 supplies power to the BLE 214 with power received via the power receiving antenna 200 so that the BLE 214 can operate. At this time, the voltage level 403 of the Vrx signal 209 is "Hi", as described above, and the voltage level 404 of the Vbat signal 213 is "Lo" due to the pull-down effect of the fixed resistor 305.

A state 407 indicates that the power receiving apparatus 100 receives power (the power receiving state 400 is "1") and there is a remaining battery capacity (the state 401 where there is no remaining battery capacity is "1"). In the state 407, the application mounted on the electronic apparatus 205 can use the BLE 214. Accordingly, the supply source 402 of the power 215 to the BLE 214 is to be a "battery". When the supply source 402 of the power 215 to the BLE 214 is the first constant voltage circuit 202, if the power receiving apparatus 100 receives power, an application other than the WC profile mounted on the electronic apparatus 205 can perform BLE connection with another communication apparatus using the BLE 214. If the power receiving apparatus 100 does not receive power, however, the BLE 214 cannot operate so that the application mounted on the electronic apparatus 205 cannot use the BLE 214. To supply the power 215 to the BLE 214 from the battery 204, the voltage level 403 of the Vrx signal 209 and the voltage level 404 of the Vbat signal 213 are respectively "Lo" and "Hi".

A state 408 indicates that the power receiving apparatus 100 does not receive power (the power receiving state 400 is "0") and there is a remaining battery capacity (the state 401 where there is no remaining battery capacity is "1"). In the state 408, the battery 204 supplies the power to the BLE 214 from a similar reason to that in the state 407. The voltage level 403 of the Vrx signal 209 is "Lo" using the pull-down effect, and the voltage level 404 of the Vbat signal 213 is "Hi".

Figure 5:
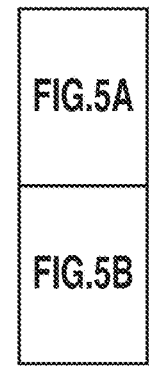
FIG. 5, composed of FIG. 5A and FIG. 5B, is a sequence diagram in a first exemplary embodiment.
Figure 5A:
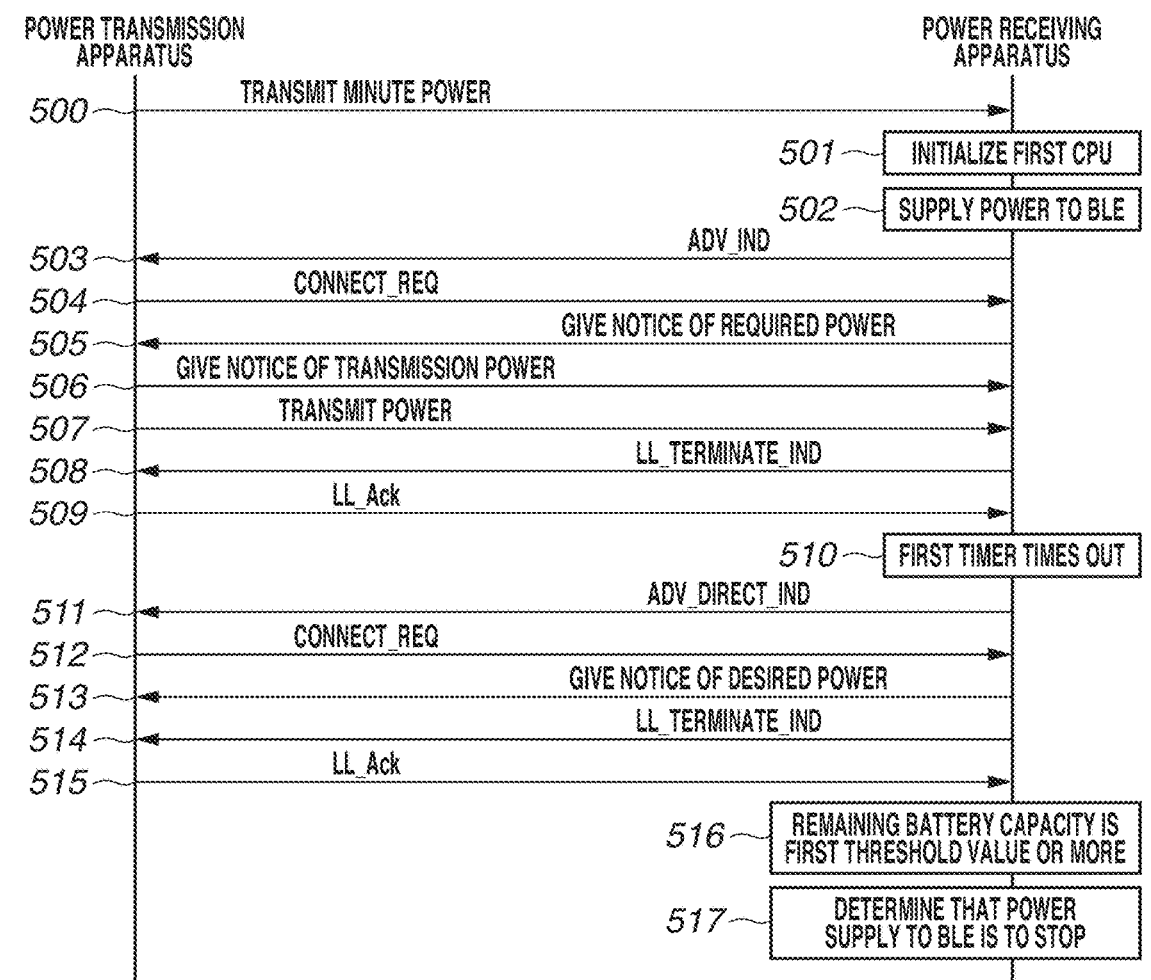
Figure 5B:
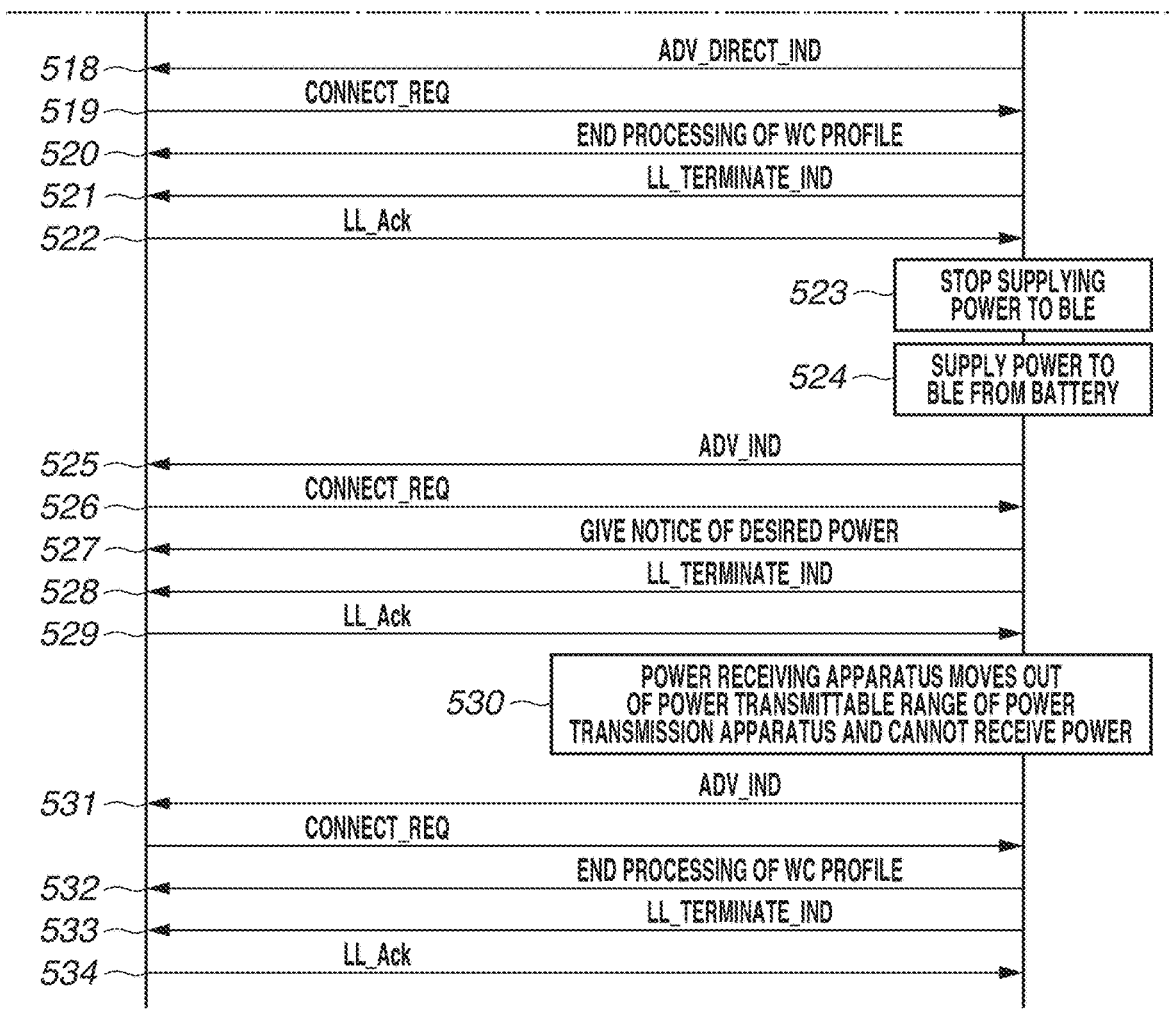
Figure 6:
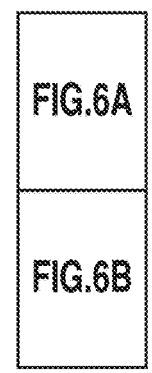
FIG. 6, composed of FIG. 6A and FIG. 6B, is a flowchart applicable to an operation of a first CPU.
Figure 6A:
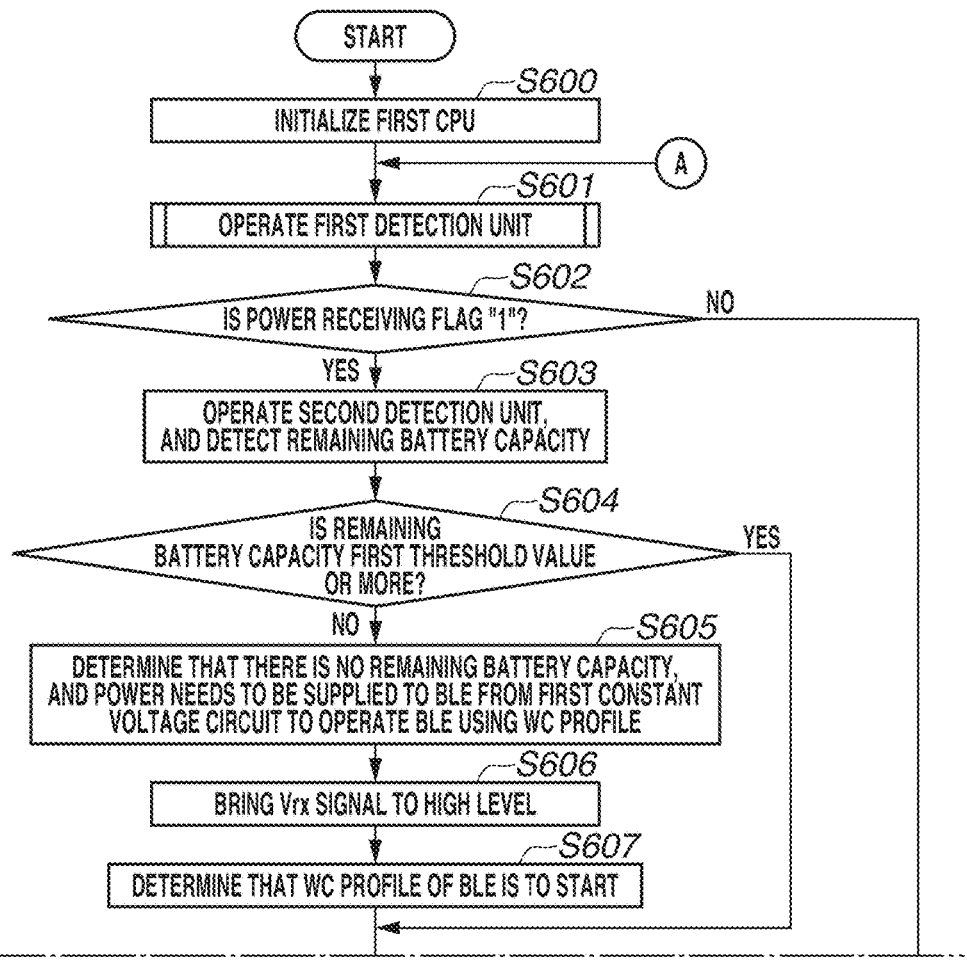
Figure 10:
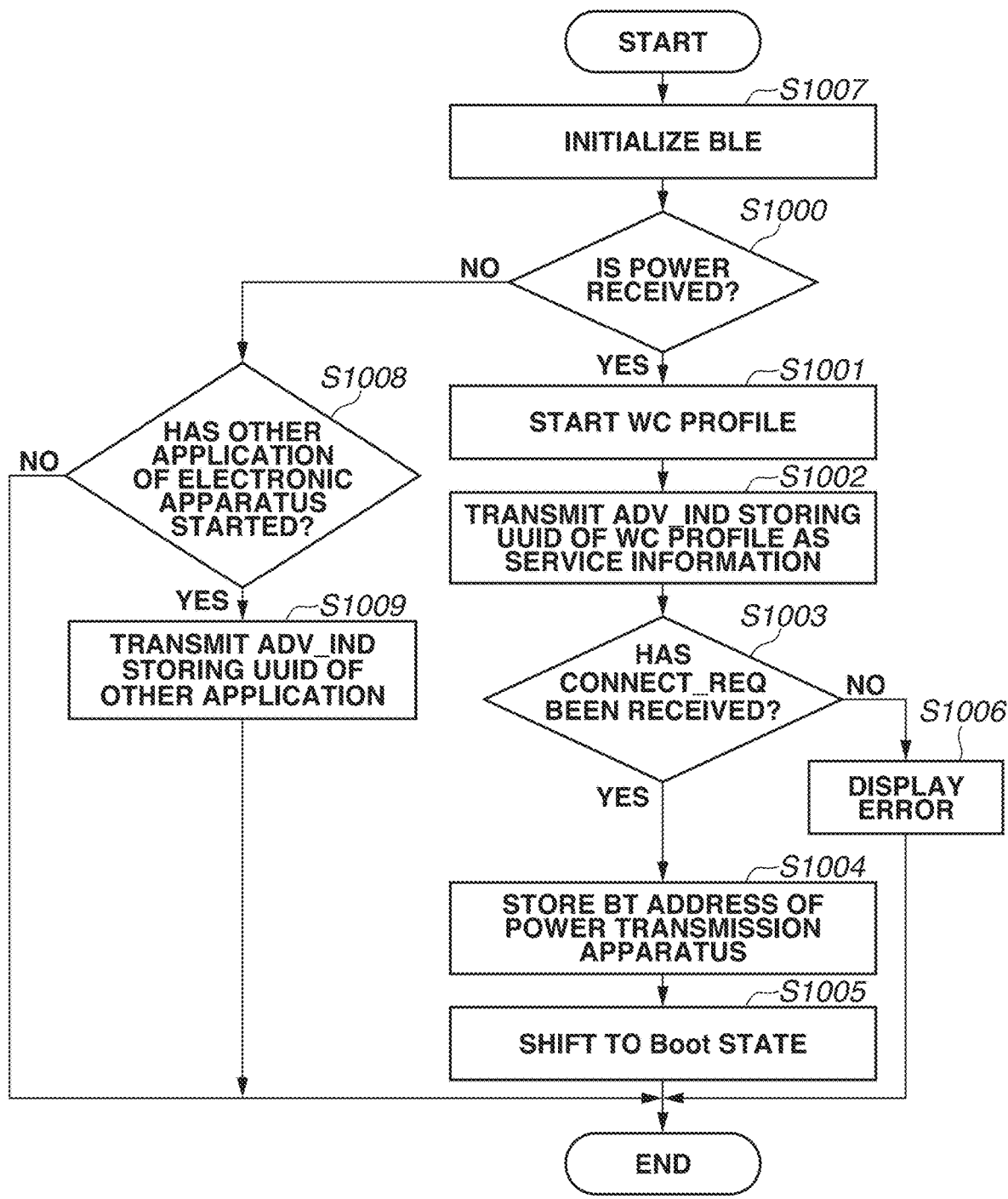
Figure 11:
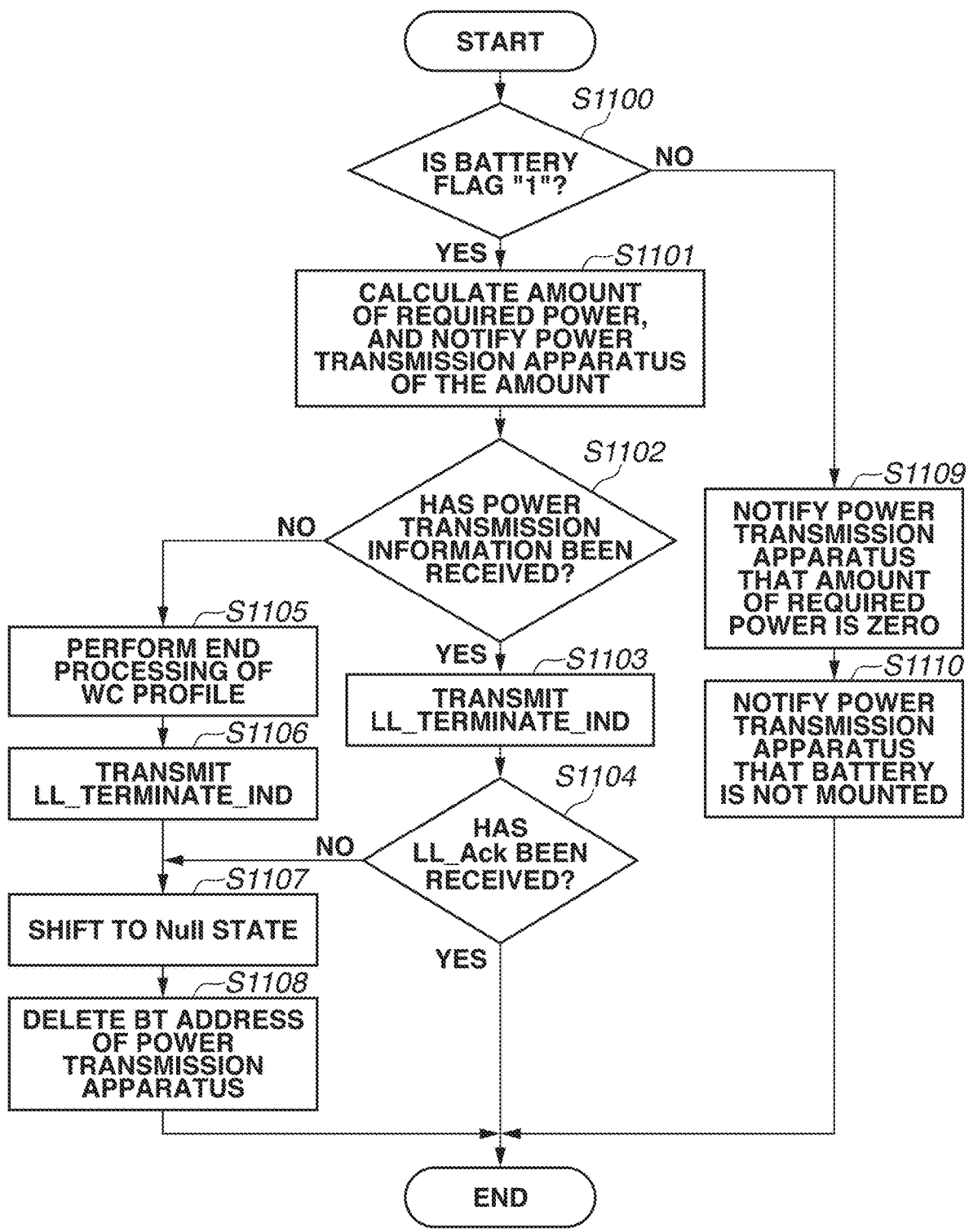
FIG. 11 is a flowchart of the BLE in a Boot state.
Figure 12:
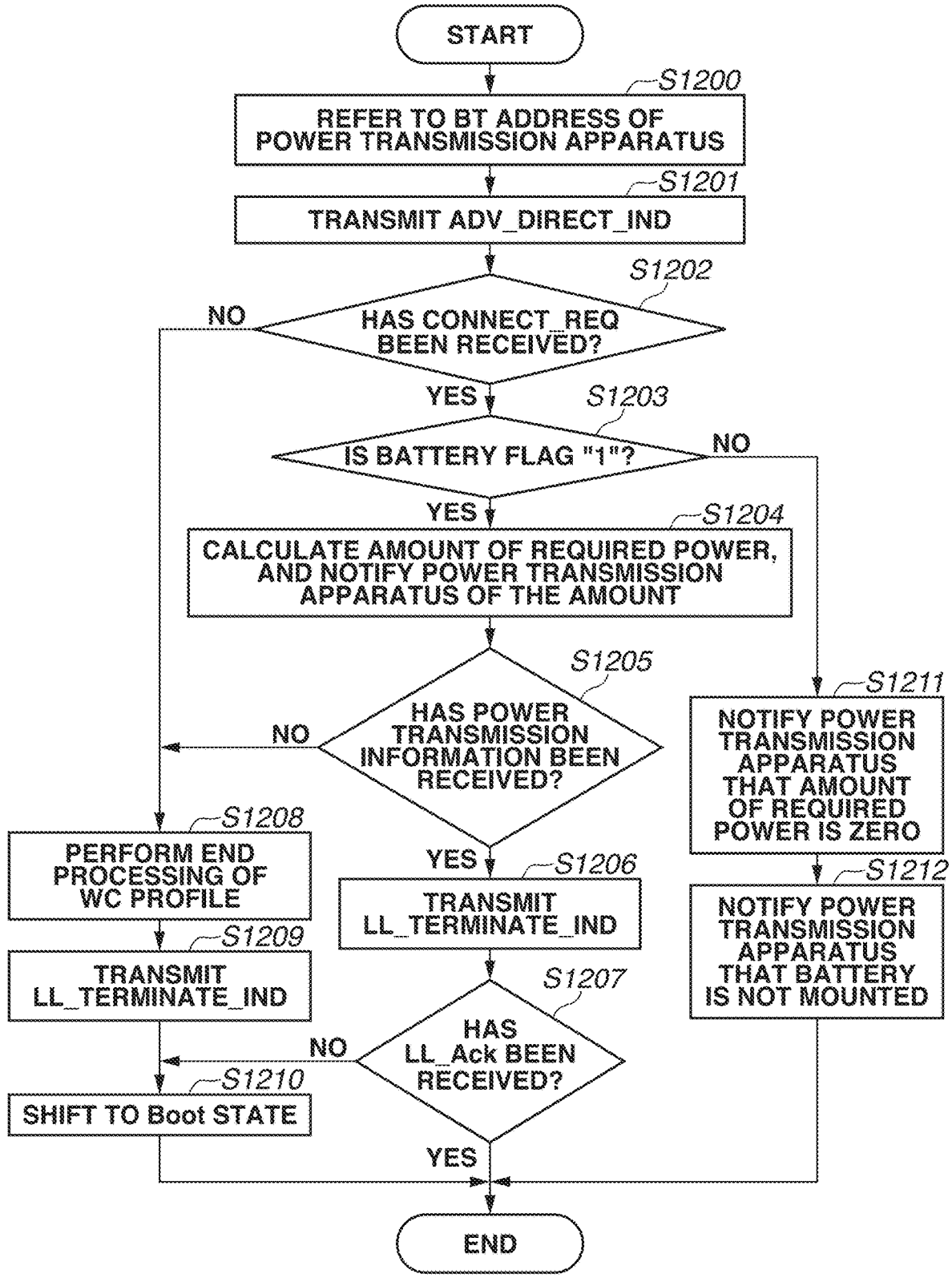
FIG. 12 is a flowchart of the BLE in an On state.
Figure 13:
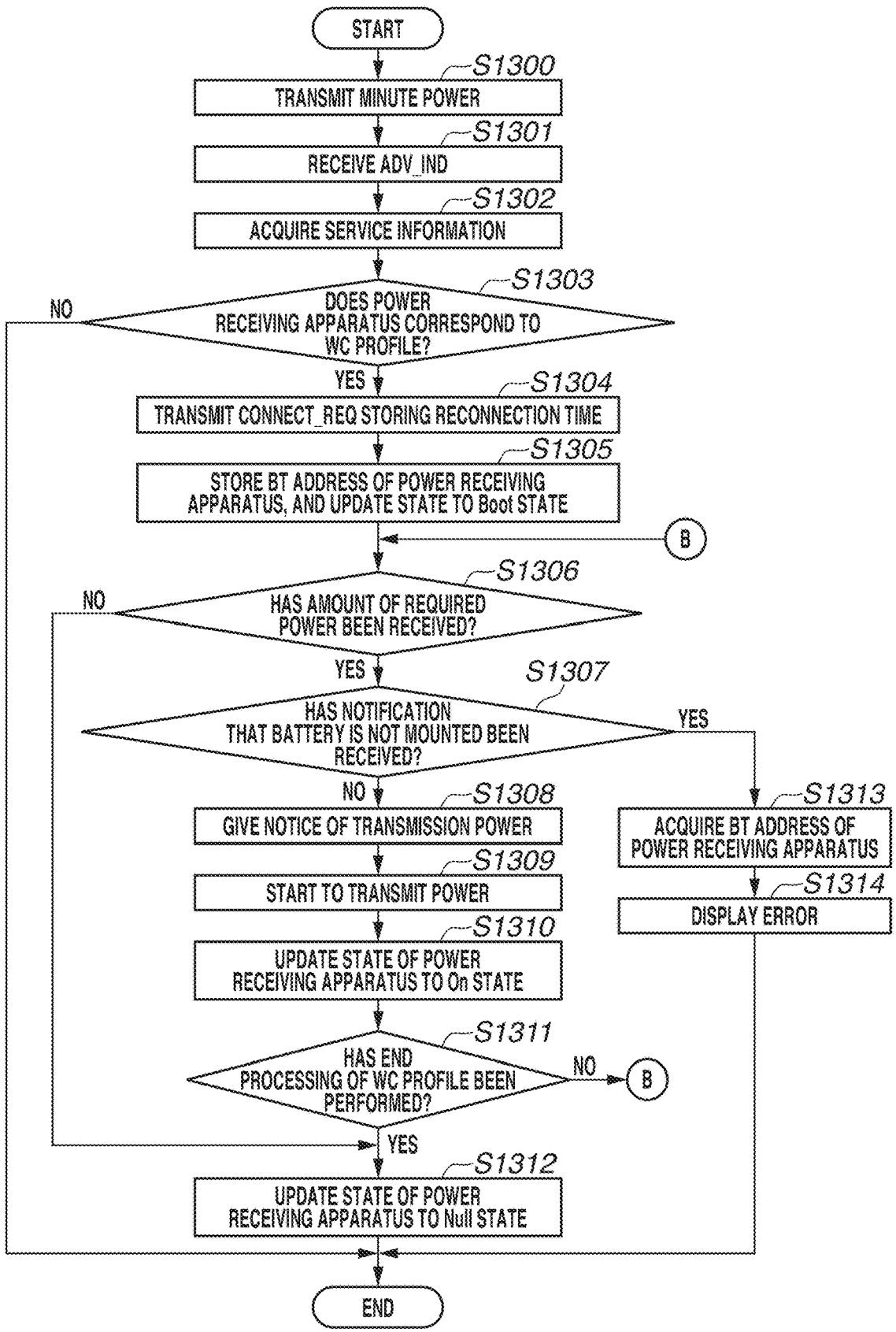
FIG. 13 is a flowchart applicable to the power transmission apparatus.
Figure 14:
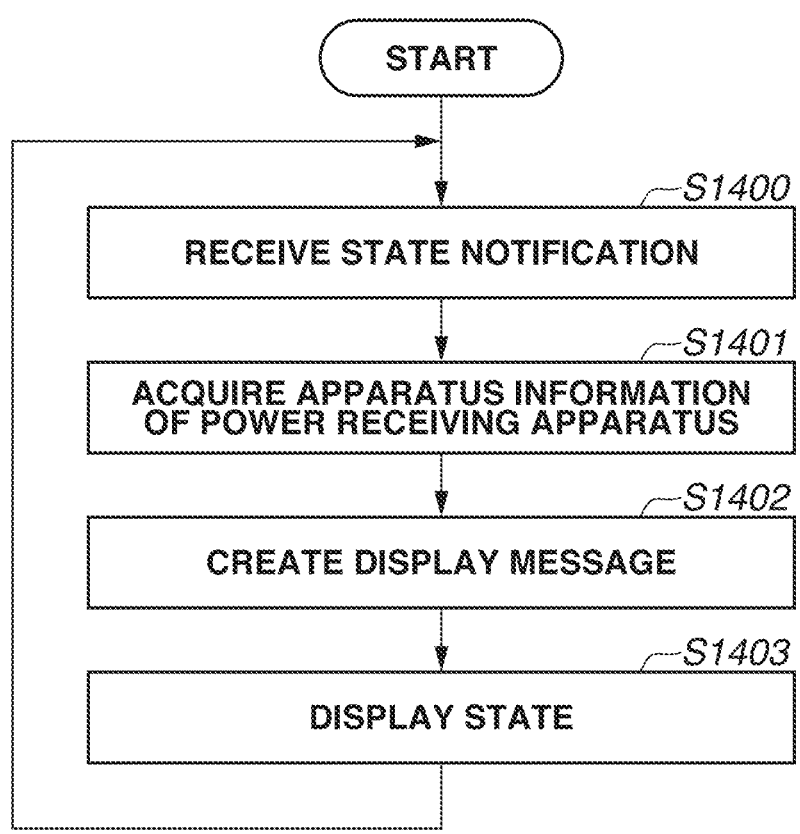
FIG. 14 is a flowchart applicable to control of a display unit in the power transmission apparatus.

FIGS. 5A and 5B are a sequence diagram in the present exemplary embodiment, FIGS. 6A and 6B are a flowchart applicable to an operation of the first CPU 206, and FIG. 7 is a flowchart applicable to processing of the first switching unit 207 by the first CPU 206. FIG. 8 is a flowchart applicable to the first detection unit 217, and FIG. 9 is a flowchart applicable to the power source control unit 210. FIG. 10 is a flowchart of the BLE 214 after power thereto is turned on, FIG. 11 is a flowchart of the BLE 214 in the Boot state 1601, FIG. 12 is a flowchart of the BLE 214 in the On state 1602, FIG. 13 is a flowchart applicable to the power transmission apparatus 101, and FIG. 14 is a flowchart applicable to control of the display unit 219 in the power transmission apparatus 101.

FIG. 15 illustrates a portion, relating to charging processing, of the first storage unit 222. A power receiving flag 1500 is "1" if a value of a voltage received by the power receiving antenna 200 (i.e., a received voltage 1501) is stable, and is "0" if not. A battery flag 1502 is "1" if the battery 204 is mounted, and is "0" if not. FIG. 15 indicates that the power receiving antenna 200 receives a stable voltage (the power receiving flag 1500 is "1"), and its voltage value is five volts (the received voltage 1501 is "5V"). The battery 204 is mounted (the battery flag 1502 is "1").

Figure 16:
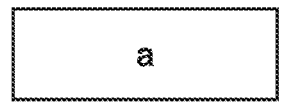
FIG. 16 illustrates a portion, relating to an identifier of the power transmission apparatus, of the first storage unit.

FIG. 16 illustrates a portion, relating to an identifier of the power transmission apparatus 101, of the first storage unit 222. When the BLE 214 shifts to the Boot state 1601 in the WC profile, an identifier of a communication partner (in this case, the BLE 234 in the power transmission apparatus 101) which is executing the WC profile is stored. A case where a BT address of the BLE 234 is stored will be described below. In FIG. 16, the BT address of the BLE 234 in the power receiving apparatus 100 is abbreviated to "a".

Figure 17:
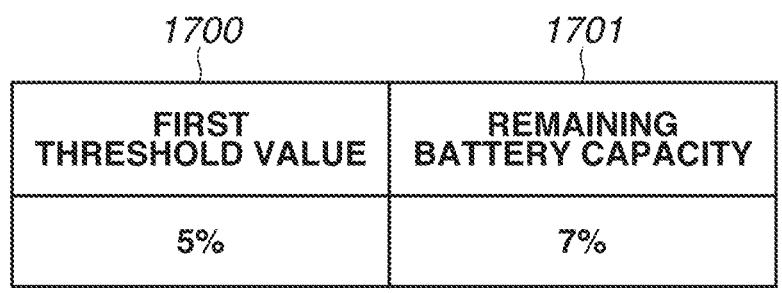
FIG. 17 illustrates a portion, relating to a battery state, of the first storage unit.

FIG. 17 illustrates a portion, relating to a battery state, of the first storage unit 222. A first threshold value 1700 of a remaining battery capacity 1701 in which at least the power source control unit 210 can operate, and the remaining battery capacity 1701 are indicated by percentage. The remaining battery capacity 1701 is detected by the second detection unit 218. In FIG. 17, at least the power source control unit 210 can operate if the first threshold value 1700 of the remaining battery capacity 1701 is 5%, and the remaining battery capacity 1701 detected by the second detection unit 218 is 7%.

Figure 18:
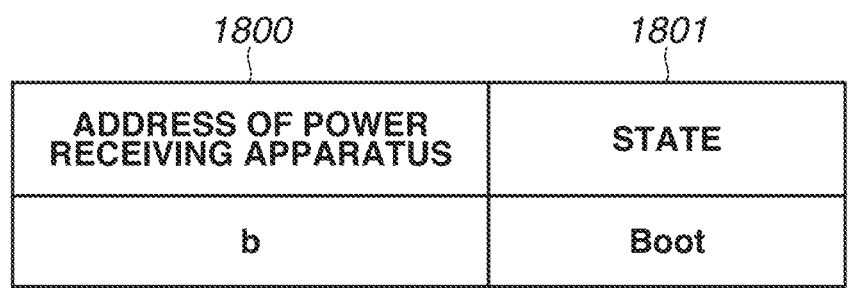
FIG. 18 illustrates a storage unit in the power transmission apparatus.

FIG. 18 illustrates an example of the storage unit 235 in the power transmission apparatus 101. An address 1800 of the power receiving apparatus 100 stores an identifier of a communication partner which is executing the WC profile (in this case, the BLE 214 in the power receiving apparatus 100). A case where a BT address of the BLE 214 is stored will be described below. A state 1801 is a state of the communication partner in the WC profile. In FIG. 18, the BT address 1800 of the BLE 214 is "b", and the state 1801 of the power receiving apparatus 100 is a "Boot" state.

Operations according to the present exemplary embodiment will be described below based on the sequence illustrated in FIG. 5 and the flowcharts illustrated in FIGS. 6 to 13.

<Processing from State where there is No Remaining Battery Capacity to Start of Charging>

First, operations from the state 405 where the battery 204 in the power receiving apparatus 100 has no remaining capacity to the state 406 where charging starts will be described.

In step 500 and step S1300, the power transmission apparatus 101 transmits minute power enough for the first CPU 206 and the BLE 214 to operate. The power receiving apparatus 100 can operate the WC profile on the BLE 214 by receiving the minute power.

If the output 208 of the first constant voltage circuit 202 becomes a voltage at which the first CPU 206 can operate, then in step 501 and step S600, the power receiving apparatus 100 initializes (what is called power-on resets) the first CPU 206. If the initialization is completed, then in step S601, the first CPU 206 operates the first detection unit 217.

In step S800, the first detection unit 217 detects a received voltage serving as an output 208 of the power receiving antenna 200 (or an output of the rectifying circuit 201). In step S801, the first detection unit 217 determines whether a voltage value of the received voltage is stable. If the voltage value of the output 208 is stable (YES in step S801), then in step S802, the first detection unit 217 updates the power receiving flag 1500 to "1". In step S803, the first detection unit 217 stores the received voltage in the received voltage 1500, and the processing ends.

In step S602, the first CPU 206 determines whether the power receiving flag 1500 is "1". If the power receiving flag 1500 is "1" (YES in step S602), then in step S603, the first CPU 206 operates the second detection unit 218, and detects a remaining battery capacity. Suppose that the remaining battery capacity is 1%. The first CPU 206 then compares the remaining battery capacity, which has been detected in step S603, with the first threshold value 1700.

The first threshold value 1700 is 5%. In step S604, the first CPU 206 determines whether the remaining battery capacity is the first threshold value 1700 or more. If the remaining battery capacity is not the first threshold value 1700 or more (NO in step S604), i.e., the power source control unit 210 is not operating, the FET 304 in the second switching unit 211 is off, and the BLE 214 is not supplied with power. Then in step S605, the first CPU 206 determines that the battery 204 has no remaining capacity, and the BLE 214 needs to be supplied with power from the first constant voltage circuit 202 to operate the BLE 214 using the WC profile. In step S606, the first CPU 206 brings the Vrx signal 209 to a high level. In step 502, the power receiving apparatus 100 turns on the FET 302 in the first switching unit 207 to supply the power to the BLE 214 from the first constant voltage circuit 202. In step S607, the first CPU 206 determines that the WP profile of the BLE 214 is to start. In step S608, the first CPU 206 executes the flow after the BLE 214 is supplied with power.

If the BLE 214 is supplied with the power, then in step S1007, the BLE 214 is initialized. In step S1000, the BLE 214 checks whether the power receiving apparatus 100 receives power. If the power is received (YES in step S1000), then in step S1001, the BLE 214 starts the WC profile.

In step S1002 and step 503, the BLE 214 transmits an ADVERTISING INDICATION (ADV_IND) packet storing a universally unique identifier (UUID) representing the WC profile as service information corresponding to the BLE 214. The ADV_IND packet is one type of ADVERTISING packet defined in the BLE standard, and serves to give notice of service information supported by itself. The ADV_IND packet also includes information such as an apparatus type (e.g., a camera or a smartphone), a manufacturer name, a model name, and a serial number of the electronic apparatus 205.

In step S1301, the power transmission apparatus 101 receives the ADV_IND packet. In step S1302, the power transmission apparatus 101 decrypts the ADV_IND packet, and acquires the service information. In step S1303, the power transmission apparatus 101 determines whether the power receiving apparatus 100 corresponds to the WC profile. If the power receiving apparatus 100 corresponds to the WC profile (YES in step S1303), then in step S1304 and step 504, the power transmission apparatus 101 transmits a CONNECT_REQ packet serving as one type of the ADVERTISING packet and to be transmitted when BLE connection is required. The CONNECT_REQ packet stores time information representing a reconnection time. The reconnection time represents an interval at which the BLE 214 in the power receiving apparatus 100 is reconnected to the BLE 234 in the power transmission apparatus 101 in the Boot state 1601 and the On state 1602. The BLE 214 in the power receiving apparatus 100 requests connection of the BLE 234 for each interval, and notifies the BLE 234 of information about power receiving and the charging processing such as the received voltage and the remaining power capacity.

In step S1305, the power transmission apparatus 101 transmits the CONNECT_REQ packet, then stores the BT address of the BLE 214 in the power receiving apparatus 100 in the storage unit 235, and updates the state 1801 to the Boot state 1601. The BLE 234 in the power transmission apparatus 101, which has transmitted the CONNECT_REQ packet, then operates as a master in the BLE standard.

In step S1003, the BLE 214 in the power transmission apparatus 101 determines whether it has received the CONNECT_REQ packet. If the CONNECT_REQ packet has been received (YES in step S1003), then in step S1004, the BLE 214 in the power receiving apparatus 100 stores the BT address of the power transmission apparatus 101 in the first storage unit 222. In step S1005, the BLE 214 shifts to the Boot state 1601, and then the processing ends. The BLE 214, which has received the CONNECT_REC packet, then operates as a slave in the BLE standard.

In step S609, the first CPU 206 determines whether the BLE 214 has shifted to the Boot state 1601. If the BLE 214 has shifted to the Boot state 1601 (YES in step S609), then in step S610, the first CPU 206 operates the second detection unit 218. In step S611, the first CPU 206 confirms whether the battery 204 is mounted.

If the battery 204 is mounted (YES in step S611), then in step S612, the first CPU 206 causes the second detection unit 218 to update the battery flag 1502 to "1". In step S614, the first CPU 206 executes a flow in the Boot state 1601 of the BLE 214.

In step S1100, the BLE 214 determines whether the battery flag 1502 is "1". If the battery flag 1502 is "1" (YES in step S1100), then in step S1101 and step 505, the BLE 214 calculates an amount of power required of the power transmission apparatus 101, and notifies the power transmission apparatus 101 of the calculated amount of the required power.

In step S1306, the power transmission apparatus 101 determines whether it has received the amount of the required power. If the amount of the required power has been received (YES in step S1306), then in step S1307, the power transmission apparatus 101 determines whether it has received a notification that the battery 204 is not mounted.

If the battery 204 is mounted and the notification has not been received (NO in step S1307), then in step S1308 and step 506, the power transmission apparatus 101 gives notice of the transmitted power. In step S1309 and step 507, the power transmission apparatus 101 transmits power. In step S1310, the power transmission apparatus 101 updates a state of the power receiving apparatus 100, which is stored in the storage unit 235, to the On state 1602. In step S1311, the power transmission apparatus 101 determines whether end processing of the WC profile has been performed. If the end processing of the WC profile has not been performed (NO in step S1311), the power transmission apparatus 101 repeats the above-mentioned processing from step S1306 to step S1310 to transmit an appropriate amount of the transmitted power while following the amount of the required power, which changes with time, based on the remaining battery capacity. If the end processing of the WC profile has been performed (YES in step S1311) because the battery 204 has been fully charged or a malfunction has occurred in the wireless power transmission system illustrated in FIG. 1, then in step S1312, the power transmission apparatus 101 updates the state of the power receiving apparatus 100 to the Null state 1600, and the processing ends.

In step S1102, the BLE 214 in the power receiving apparatus 100 determines whether it has received power transmission information. If the power transmission information has been received (YES in step S1102), then in step S1103 and step 508, the BLE 214 in the power receiving apparatus 100 transmits LL_TERMINATE_IND serving as a message for cutting off BLE connection to the BLE 234 in the power transmission apparatus 101.

If the BLE 234 in the power transmission apparatus 101 receives the LL_TERMINATE_IND, then in step 509, the power transmission apparatus 101 transmits LL_Ack serving as a message for permitting the BLE connection to be cut off to the BLE 214 in the power receiving apparatus 100.

In step S1104, the BLE 214 in the power receiving apparatus 100 determines whether it has received the LL_Ack. If the LL_Ack has been received (YES in step S1104), the processing ends.

In step S615, the first CPU 206 sets, when the processing in the Boot state 1601 ends, the reconnection time stored in the CONNECT_REQ packet to the first timer 221, and starts the first timer 221. In step S616, the first CPU 206 operates the first detection unit 217 again. If the processing of the first detection unit 217 ends, then in step S617, the first CPU 206 refers to the received voltage 1501. In step S618, the first CPU 206 determines whether the received voltage is appropriate for the transmitted power, which has been received in step 512. The determination includes a method for determining that a value of the received voltage is appropriate if it falls within an error range within ±5% of a value of a transmitted voltage calculated from the received transmitted power.

If the received voltage is appropriate (YES in step S618), then in step S619, the BLE 214 shifts to the On state 1602 in the WC profile. When the BLE 214 receives the appropriate voltage, and shifts to the On state 1602, the BLE 214 brings the signal 226 to a high level to make the LED in the charging state display unit 223 light up. While the BLE 214 is communicating with the BLE 234 in the power transmission apparatus 101 using the WC profile, a LED in the communication display unit 224 does not light up.

At this time point, the power receiving apparatus 100 starts to charge the battery 204 via the charging circuit 203. The BLE 214 brings, when it receives the power required of the power transmission apparatus 101 and shifts to the On state 1602, the signal 227 to a high level to make the LED in the power receiving state display unit 223 light up, and notifies a user of the power receiving apparatus 100 that the battery 204 is being charged via the charging circuit 203.

In step S620, the first CPU 206 determines whether the first timer 221 has timed out. If the first timer 221 has timed out (in YES in step S620 and in step 510), then in step S621, the first CPU 206 executes a flow in the On state 1602 of the BLE 214.

In step S1200, the BLE 214 in the power receiving apparatus 100 first refers to the BT address (in FIG. 16) of the power transmission apparatus 101 stored in the first storage unit 222 in the On state 1602. In step 511 and step S1201, the BLE 214 in the power receiving apparatus 100 transmits an ADV_DIRECT_IND packet storing the BT address of the power transmission apparatus 101. The ADV_DIRECT_IND packet is a packet for specifying a partner which permits BLE connection (the BLE 234 in the power transmission apparatus 101 in this case) by an address. In step S1202, the BLE 214 in the power receiving apparatus 100 determines whether it has received the CONNECT_REQ packet that has been transmitted by the BLE 234 in the power transmission apparatus 101. If the CONNECT_REQ packet has been received (in step 512 and YES in step S1202), then in step S1203, the BLE 214 checks whether the battery flag 1502 is "1". If the battery flag 1502 is "1" because the battery 204 is mounted (YES in step S1203), then in step S1204, the BLE 214 calculates the amount of the required power based on the received voltage and the remaining battery capacity 1701, and notifies the power transmission apparatus 101 of the calculated amount of the required power. In steps S1205, S1206, and S1207, the processing in steps S1102, S1103, and S1104 already described is performed, and the processing ends.

If the flow in the On state 1602 of the BLE 214 ends, then in step S615, the first CPU 206 starts the first timer 221 again, and executes processing in the On state 1602 for each reconnection time. The foregoing is processing from the state where there is no remaining battery capacity to the start of charging.

<Processing Performed when Remaining Battery Capacity is First Threshold Value or More by Charging>

The state 406 where the remaining battery capacity increases to the first threshold value 1700 or more from the state 405 where there is no remaining battery capacity by charging will be described below based on a flow applicable to processing of the first switching unit 207 by the first CPU 206 illustrated in FIG. 7.

In step S700, the first CPU 206 detects the remaining battery capacity. In step S701, the first CPU 206 determines whether the remaining battery capacity is the first threshold value 1700 or more. If the remaining battery capacity is the first threshold value 1700 or more (YES in step S701), then in step S702, the first CPU 206 determines that the power supply to the BLE 214 is to stop and is to be switched to the battery 204. At this time point, the power transmission apparatus 101 grasps a state of the BLE 214 in the power receiving apparatus 100 as being the On state 1602. On the other hand, if the first CPU 206 switches the power supply to the BLE 214 to the battery 204, the power supply to the BLE 214 stops once. Thus, the BLE 214 shifts to the Null state 1600. More specifically, the state of the BLE 214, which is grasped by the power transmission apparatus 101, and an actual state of the BLE 214 do not match each other. This is not good in considering operations of the wireless power transmission system.

In step S703, the first CPU 206 thus performs the determination in step S701, and then causes the BLE 214 to perform end processing of the WC profile. The end processing means processing for bringing the state of the BLE 214 in the power receiving apparatus 100, which is grasped by the BLE 234 in the power transmission apparatus 101, to the Boot state 1601 by causing the power transmission apparatus 101 to stop transmitting power to the power receiving apparatus 100. Further, the end processing includes processing for the BLE 214 to notify the BLE 234 in the power transmission apparatus 101 to complete the WC profile, to complete the WC profile and to cut off the BLE connection, and also includes processing for bringing the state of the BLE 214 in the power receiving apparatus 100, which is grasped by the BLE 234 in the power transmission apparatus 101, to the Null state 1600. Thus, when the first CPU 206 switches the power supply to the BLE 214 to the battery 204, the state of the BLE 214 in the power receiving apparatus 100, which is grasped by the power transmission apparatus 101, and the actual state of the BLE 214 are made to match each other.

In step S704, the first CPU 206 performs the end processing of the WC profile, and then the BLE 214 shifts to the Null state 1600. In step S705, the first CPU 206 brings the Vrx signal 209 to a low level, to make the power supply to the BLE 214 from the first constant voltage circuit 202 stop, and the processing returns to step S601.

Processing by the power source control unit 210 will be described below. In step S901 and step 516, the remaining battery capacity is the first threshold value 1700 or more. If the output voltage 212 of the battery 204 reaches a voltage value at which the power source control unit 210 can operate, then in step S902, the power source control unit 210 is initialized by power-on resetting. In step S903, the power source control unit 210 then operates the third detection unit 220, and detects the voltage level 403 of the Vrx signal 209. In step S904, the power source control unit 210 determines whether the Vrx signal 209 is at a low level by the processing in step S705. If the Vrx signal 209 is at a low level (YES in step S904), then in step S905 and step 524, the power source control unit 210 brings the Vbat signal 213 to a high level to supply the power to the BLE 214 from the battery 204, and the processing ends.

While the first CPU 206 operates the first detection unit 217 in step S601, the power transmission apparatus 101 transmits the minute power at this time. While it is determined whether the remaining battery capacity is the first threshold value 1700 or more in step S604, the remaining battery capacity is the first threshold value 1700 or more as described above (YES in step S604). Accordingly, the first CPU 206 determines that the WC profile of the BLE 214 is to be operated in step S607. The BLE 214 in the power receiving apparatus 100 transmits the ADV_IND packet in step 525, and receives the CONNECT_REQ from the BLE 234 in the power transmission apparatus 101 in step 526. In steps 527, 528, and 529, the processing in steps 513, 514, and 515 already described is performed so that charging can be resumed.

Even when the remaining battery capacity exceeds the first threshold value 1700 in step 516, and the electronic apparatus 205 operates so that the second CPU 225 communicates with another communication apparatus using the BLE 214, the BLE 214 has already been supplied with the power from the battery 204. Even if the power receiving apparatus 100 moves out of the power transmittable range 102 illustrated in FIG. 1, and cannot receive power (the state 408), therefore, the power supply to the BLE 214 is not interrupted, and connection to the another communication apparatus using the BLE 214 is not cut off. When the application mounted on the electronic apparatus 205 is connected to another electronic apparatus using the BLE 214, therefore, the BLE 214 brings the signal 227 to a high level to make the LED in the communication display unit 224 light up.

A display unit in the BLE 214 in the power receiving apparatus 100 will be referred to. The BLE 214 includes two display units, i.e., the charging state display unit 223 and the communication display unit 224 as the display unit. When the BLE 214 is connected to the BLE 234 in the power transmission apparatus 101 using the WC profile to perform the charging processing, only the charging state display unit 223 is made to light up, and the communication display unit 224 is not made to light up. The communication display unit 224 is made to light up, when the application mounted on the electronic apparatus 205 (i.e., the application other than the WC profile) uses the BLE 214. Thus, the two units, i.e., the charging state display unit 223 and the communication display unit 224 can be avoided lighting up when the WC profile is being executed, producing an effect of power consumption. A function of invalidating the BLE 214 by a user interface (not illustrated) of the electronic apparatus 205 selecting whether the BLE 214 is valid or invalid is normally mounted on the electronic apparatus 205 having a communication function. In such a case, the two units, i.e., the charging state display unit 223 and the communication display unit 224 can also be avoided lighting up during the charging, to prevent the user from being confused by the communication display unit 224 also lighting up during the charging.

Even if the power receiving apparatus 100 moves out of the transmittable range 102 illustrated in FIG. 1 during the charging in step 530 (state 408), the BLE 214 can operate. Accordingly, steps 520, 521, and 522 already described are performed in steps 532, 533, and 534 so that the end processing of the WC profile can be performed between the BLE 214 and the BLE 234 in the power transmission apparatus 101. Thus, the state of the BLE 214 in the power transmission apparatus 101, which is grasped by the power transmission apparatus 101, and the actual state of the BLE 214 can be made to match each other.

<Processing Performed when No Battery is Mounted>

If the battery flag 1502 is "0" (i.e., the battery 204 is not mounted) (NO in step S1100), then in step S1109, the BLE 214 notifies the BLE 234 in the power transmission apparatus 101 that the required power is zero watt. In step S1110, the BLE 214 then notifies the BLE 234 that the battery 204 is not mounted.

If the notification has been received (YES in step S1307), then in step S1313, the BLE 234 in the power transmission apparatus 101 acquires the BT address of the BLE 214 in the power receiving apparatus 100. In step S1314, the BLE 234 in the power transmission apparatus 101 displays an error on the display unit 219.

Control of the display unit 219 at this time will be described. In step S1400, the BLE 234 in the power transmission apparatus 101 receives state notification that the battery 204 is not mounted. In step S1401, the BLE 234 acquires the BT address serving as an identifier of the power receiving apparatus 100 from the packet defined in the BLE standard representing the notification. In step S1402, the CPU 233 in the power transmission apparatus 101 creates a display message from the BT address and a content of the state notification. If a message representing "BT address"+ "state notification" is created, for example, a message "A battery at a BT address b (b is the BT address of the BLE 214) is not mounted" is created. The BT address in the message may be other information included in the ADV_IND packet transmitted by the BLE 214 in the power receiving apparatus 100 that is executing the WC profile (e.g., a manufacturer name, an apparatus type, a model name, and a serial number of the electronic apparatus 205). The BT address in the message may be, for example, "Canon (a manufacturer name), a camera (an apparatus type), xxx (a model name)". FIG. 19A illustrates an example of display using an apparatus type and a model name for the message. In FIG. 19A, a message "BATTERY OF CAMERA xxx IS NOT MOUNTED." is creased. In step S1403, the CPU 233 displays a state of the power receiving apparatus 100. The state of the power receiving apparatus 100 is displayed on the display unit 219 in the power transmission apparatus 101 so that the user of the power receiving apparatus 100 can recognize the state of the power receiving apparatus 100. If the display unit 228 in the power receiving apparatus 100 only includes a simple display unit such as an LED, for example, a unit by which the user of the power receiving apparatus 100 can recognize the state of the power receiving apparatus 100 in the display unit 219 in the power transmission apparatus 101 is valid. Similarly, even if the display unit 228 in the electronic apparatus 205 includes a sophisticated user interface (UI) such as a liquid crystal display (LCD), a unit by which the user of the power receiving apparatus 100 can recognize the state of the power receiving apparatus 100 in the display unit 219 in the power transmission apparatus 101 is valid when there is no remaining battery capacity and when the operation of the electronic apparatus 205 is off.

<Description about Error Processing>

While normal processing has mainly been described above, error processing in each of the flowcharts will be described below.

If the power receiving flag 1500 is "0" (NO in step S602), the power receiving apparatus 100 moves out of the power transmittable range 102 while receiving a voltage at which the first CPU 206 may operate once, and a transmission efficiency between the power transmission antenna 231 and the power receiving antenna 200 may decrease due to a foreign substance. In addition, the power receiving apparatus 100 may exist in the transmittable range 102 of the power transmission apparatus 101 in the wireless power transmission system, which does not correspond to the WC profile. In such a case, the first CPU 206 ends the processing without performing processing in the Null state 1600 of the BLE 214 in step S608. This eliminates the possibilities that the BLE 214 is operated with the received voltage not being stable so that the wireless power transmission system enters an unstable state and that useless processing for operating the BLE 214 when the WC profile cannot be executed is performed. A system, which is appropriate in system control, can be implemented.

If the CONNECT_REQ packet has not been received (NO in step S1003), e.g., if the user of the power receiving apparatus 100 takes the power receiving apparatus 100 out of the communicable range 103, then in step S1006, the BLE 214 displays an error by repeatedly bringing the signal 226 to a high level or a low level to make the charging state display unit 223 flash without shifting to the Boot state 1601.

If the received voltage is not appropriate (NO in step S618), then in step S622, the BLE 214 ends the WC profile without shifting to the On state 1602. A factor disabling power receiving includes a decrease in the transmission efficiency between the power transmission antenna 231 and the power receiving antenna 200 due to a foreign substance. This enables a state of the BLE 214 in the power receiving apparatus 100, which is recognized by the power transmission apparatus 101, to return to the Null state 1600, and thus enables the state of the BLE 214 in the power receiving apparatus 100, which is grasped by the power transmission apparatus 101, and the actual state of the BLE 214 to match each other.

If the power transmission information has not been received from the power transmission apparatus 101 (NO in step S1102), then in step S1105, the BLE 214 performs the end processing of the WC profile. In step S1106, the BLE 214 transmits the LL_TERMINATE_IND to the BLE 234 in the power transmission apparatus 101. In step S1107, the BLE 214 shifts to the Null state 1600. In step S1108, the BLE 214 deletes the BT address of the power transmission apparatus 101 in the first storage unit 222. In such a case, a failure may occur in the power transmission apparatus 101. Such processing enables the BLE 214 itself to return the state to the Null state 1600 when the BLE 214 cannot shift to the On state 1602.

If the LL_Ack cannot be received (NO in step S1104), the processing ends through the above-mentioned steps S1107 and S1108.

If the BLE 234 in the power transmission apparatus 101 determines that the BLE 214 in the power receiving apparatus 100 serving as a transmission source does not correspond to the WC profile (NO in step S1303) as a result of decrypting the ADV_IND packet, which has been received in step S1301, the processing ends. This produces an effect of not performing useless BLE connection with a communication terminal that does not correspond to the WC profile.

If the power transmission apparatus 101 does not receive the amount of the required power (NO in step S1306), then in step S1312, the BLE 234 in the power transmission apparatus 101 updates the state of the power receiving apparatus 100 to the Null state 1600, and the processing ends.

Additional configurations for according to the present disclosure are illustrated below. These configurations can be implemented separately or in combination.

<Example of Another Configuration of First Switching Unit and Second Switching Unit Described in FIG. 3>

In the present exemplary embodiment, a configuration in which either one of the output 208 of the first constant voltage circuit 202 and the output 212 of the battery 204 is connected to the power 215 to the BLE 214 is important in the description of FIG. 3.

The second detection unit 218 is configured to detect the output 212 of the battery 204, as indicated by an arrow 300. However, a similar effect is obtained if the second detection unit 218 is configured to detect an event occurring before the power 215 to the BLE 214 is supplied from the battery 204. For example, the second detection unit 218 may be configured to detect the power 215 to the BLE 214. In this case, the second detection unit 218 detects whether the power to the BLE 214 is supplied in step S700, and the first CPU 206 determines whether the power to the BLE 214 is supplied in step S701.

The event occurring before the power 215 to the BLE 214 is supplied from the battery 204 includes such an event that the power source control unit 210 or the third detection unit 220 is operating. Accordingly, the second detection unit 218 may detect whether the power source control unit 210 or the third detection unit 220 is operating in step S700, and the first CPU 206 may determine whether the power source control unit 210 or the third detection unit 220 is operating in step S701.

The third detection unit 220 is configured to detect the Vrx signal 209, as indicated by an arrow 301. However, a similar effect is obtained if the third detection unit 220 is configured to detect an event occurring before the power 215 to the BLE 214 is supplied from the first constant voltage circuit 202. For example, the third detection unit 220 may be configured to detect the power 215 to the BLE 214. In this case, the third detection unit 220 detects whether the power 215 to the BLE 214 is supplied in step S903, and the power source control unit 210 determines whether the power 215 to the BLE 214 is supplied in step S904.

The event occurring before the power 215 to the BLE 214 is supplied from the battery 204 includes such an event that the first CPU 206 or the second detection unit 220 is operating. Accordingly, the third detection unit 220 may detect whether the first CPU 206 or the second detection unit 218 is operating in step S903, and the power source control unit 210 may determine whether the first CPU 206 or the second detection unit 220 is operating in step S904.

<Example of Another Configuration about First Threshold Value>

While the first threshold value 1700 is defined as the remaining battery capacity, the first threshold value 1700 may be defined as the voltage value of the battery 204. In this case, the first CPU 206 determines that overdischarge has occurred when the voltage value of the battery 204 is less than a voltage value at which the power source control unit 210 and the BLE 214 can operate. The first CPU 206 determines that overdischarge has not occurred when the voltage value of the battery 204 is not less than a voltage value (the first threshold value 1700) at which at least the power source control unit 210 and the BLE 214 can operate.

Generally, the minimum remaining battery capacity by which the electronic apparatus 205 can operate differs for each apparatus type (e.g., a camera or a smartphone) of the electronic apparatus 205 or for each model even in the same apparatus type. However, the remaining battery capacity by which the power source control unit 210 and the BLE 214 can operate is easily estimated because its function is limited. Accordingly, the configuration according to the present disclosure can easily be implemented in various electronic apparatuses 205 by defining the first threshold value 1700 as the remaining battery capacity by which at least the power source control unit 210 and the BLE 214 can operate.

While the first threshold value 1700 is defined as the remaining battery capacity by which at least the power source control unit 210 and the BLE 214 can operate in the present exemplary embodiment, the first threshold value 1700 may be a minimum remaining battery capacity by which the electronic apparatus 205 can operate. When the BLE 214 is used from the application mounted on the electronic apparatus 205, if the power is supplied to the BLE 214 from the battery 204, the application can use the BLE 214 even when the power is not received. In this case, the minimum battery capacity by which the electronic apparatus 205 can operate differs depending on the apparatus type, as described above. Thus, work for writing the first threshold value 1700 in the first storage unit 222 is performed depending on the apparatus type and the model when the power receiving apparatus 100 is shipped from a factory. The first CPU 206 may determine whether the remaining battery capacity is not less than the minimum remaining battery capacity by which the electronic apparatus 205 can operate in step S701.

As described above, when the BLE 214 is used from the application mounted on the electronic apparatus 205, the power is supplied to the BLE 214 from the battery 204. Thus, the second detection unit 220 has a function of detecting whether the application mounted on the electronic apparatus 205 is operating. The first CPU 206 may detect whether the application mounted on the electronic apparatus 205 has started in step S700, and the second detection unit 220 may determine whether the application has started in step S701.

A similar effect is also obtained even if the second detection unit 220 is configured to detect an event occurring before the application mounted on the electronic apparatus 205 starts. For example, the electronic apparatus 205 has always started before the application operates. Accordingly, the second detection unit 220 may detect whether the electronic apparatus 205 has started in step S700, and the first CPU 206 may determine whether the electronic apparatus 205 has started in step S701.

<Example of Another Configuration of Second Detection Unit>

While the second detection unit 220 detects whether the battery 204 is mounted, the second detection unit 205 may be in other states if the battery 204 cannot be charged. The other states may be damage to the battery 204, defective connection of a connection terminal used to connect the battery 204 and the charging circuit 203, and an excessive rise in temperature of the battery 204.

<Example of Another Configuration about Control of Display Unit in Power Transmission Apparatus>

A user operation introduced from the state notification, which has been received in step S1400, may be displayed in the message used in the display of the state in step S1403. For example, while the battery 204 is not mounted, a user operation to confirm whether a battery is mounted is introduced as the user operation. Accordingly, the user operation may be displayed as "CONFIRM WHETHER BATTERY OF CAMERA xxx IS CORRECTLY MOUNTED." in FIG. 19B.

The display of the state may be other information to be given notice of in step S1400. For example, a case where the other information is the remaining battery capacity is illustrated in FIG. 19C. An example of display is "REMAINING BATTERY CAPACITY OF CAMERA xxx IS 50%." in FIG. 19C. The other information may be a change in a charging state. For example, a case where the remaining battery capacity becomes 100%, and power transmission processing using the WC profile has stopped is illustrated in FIG. 19D. The example of display becomes "CHARGING OF CAMERA xxx IS COMPLETED." in FIG. 19D.

A state of the WC profile may be added to the message. For example, an example of display performed when the state 1801 of the power receiving apparatus 100 is the On state 1602 and the receiving apparatus 100 is being charged is illustrated in FIG. 19E. The example of display becomes "CAMERA xxx IS BEING CHARGED. REMAINING BATTERY CAPACITY IS 50%." in FIG. 19E.

The message may be displayed by not characters but figures.

The display unit 219 in the power transmission apparatus 101 may be a unit for notifying the user of the message. Thus, the display unit 219 may be composed of a speaker so that the user is notified of the message by voice.

<Another Configuration of Charging State Display Unit and Communication Display Unit>

In the above-mentioned configuration, the BLE 214 controls the charging state display unit 223 and the communication display unit 224. The configuration may be a configuration in which the charging circuit 203 controls the charging state display unit 223 or a configuration in which the communication display unit 224 is controlled by the second CPU 225 and displayed on the display unit 228 in the electronic apparatus 205. Alternatively, a similar effect is obtained even in their combinations.

Figure 20A:
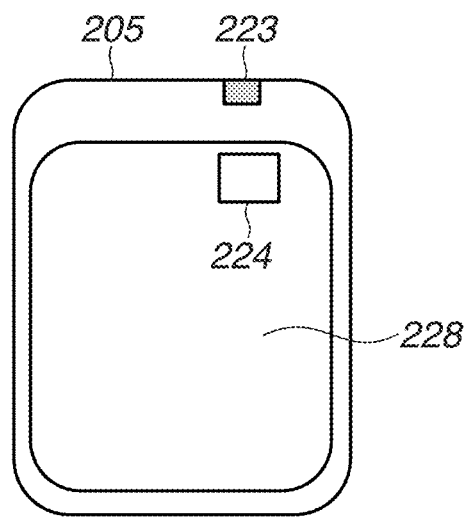
FIGS. 20A and 20B illustrate examples of display on a display unit in the power receiving apparatus.
Figure 20B:
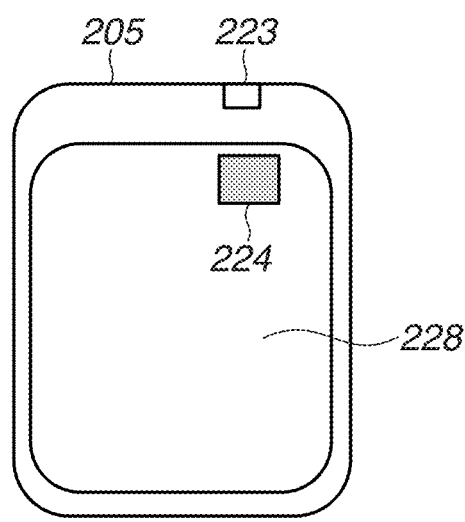

FIGS. 20A and 20B illustrate an example of display performed when the communication display unit 224 is displayed on the display unit 228 in the electronic apparatus 205.

FIGS. 20A and 20B illustrate a configuration in which the communication display unit 224 is included inside the display unit 228 in the electronic apparatus 205. For example, it is indicated that the BLE 214 has started on a LCD of a camera or a smartphone. Alternatively, it is indicated that communication via the BLE 214 is being performed.

FIG. 20A illustrates a state where the BLE 214 uses the WC profile to communicate with the BLE 234 in the power transmission apparatus 101 and to charge the battery 204, and a state at the time when the application mounted on the electronic apparatus 205 does not use the BLE 214. In this case, the charging state display unit 223 lights up, and it is indicated that the charging state display unit 223 lights up by painting out a square 223 representing the charging state display unit 223 in gray. The communication display unit 224 is not displayed. It is indicated that the communication display unit 224 is not displayed by painting out a square 224 representing the communication display unit 224 in white.

FIG. 20B illustrates a state where the power receiving apparatus 100 does not receive power and the BLE 214 does not use the WC profile, and a state where the application mounted on the electronic apparatus 205 communicates with the other electronic apparatus using the BLE 214 or the BLE 234 has started. In this case, the charging state display unit 223 does not light up (the square 223 is painted out in white). The communication display unit 224 is displayed inside the display unit 228 in the electronic apparatus 205 (the square 224 is painted out in grey).

<Other Examples of Configuration>

While the respective identifiers of the power transmission apparatus 101 and the power receiving apparatus 100 have been described as the BT address in the present exemplary embodiment, the identifiers may be a BT device address, a private address, and a random address that are described in the BLE standard.

<Other Examples of Configuration of BLE>

In the present exemplary embodiment, the BLEs 214 and 234 have been described as examples of the communication unit used in the WC profile in the present exemplary embodiment. However, the communication unit is not limited to the BLEs, and may be one used even in the application mounted on the electronic apparatus 205. A similar effect is apparently obtained if the communication unit is a communication unit conforming to a 802.11 standard serving as a standard of a wireless local area network (LAN) and communication units conforming to a near field communication (NFC) standard and other communication standards, for example.

As described above, according to the configuration of the present exemplary embodiment, if the remaining battery capacity of the battery 204 in the power receiving apparatus 100 is less than the first threshold value 1700 (i.e., when there is no remaining battery capacity), the power to the communication unit is supplied from the power receiving antenna 200 via the first constant voltage circuit 202. Thus, the communication unit can operate even if there is no remaining battery capacity. Thus, the battery 204 can be charged when there is no remaining battery capacity.

In the present exemplary embodiment, in the power receiving apparatus 100 in which the first application that operates when the power receiving apparatus 100 receives power and the second application that operates when there is a remaining battery capacity use a common communication unit, the communication unit is operated with the received power if there is no remaining battery capacity. Otherwise, the communication unit is operated with the power to the battery 204. Thus, the second application can operate even when the power receiving apparatus 100 does not receive power.

If the second application starts when there is a remaining battery capacity, the communication unit is operated with the power to the battery 204. Thus, the communication unit is not supplied with power, when the power receiving apparatus 100 does not receive power and the second application does not start. Accordingly, power consumption in the communication unit can be suppressed, producing an effect of power saving.

The power receiving apparatus 100 serving as the slave transmits the LL_TERMINATE_IND in steps 508 and 514. The LL_TERMINATE_IND may desirably be transmitted by the slave in the WC profile, although transmitted by both the master and the slave in the BLE standard. The power receiving apparatus 100 grasps information to be given notice of in the WC profile (e.g., the received voltage and the remaining battery capacity). If the power transmission apparatus 101 transmits the LL_TERMINATE_IND, excess or deficiency may occur in the information. Therefore, the LL_TERMINATE_IND may desirably be transmitted as the wireless power transmission system after the power receiving apparatus 100 serving as the slave has given notice of the information without excess or deficiency.

After the BT address (FIG. 16) of the power receiving apparatus 100 is stored in the first storage unit 222, the BLE 214 in the power receiving apparatus 100 transmits the ADV_DIRECT_IND packet. Thus, erroneous connection such as BLE connection with another adjacent power transmission apparatus can be prevented by designating a connection partner in the WC profile after the Boot state 1601.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either—power received by the power receiving unit and not stored in the battery or power stored in the battery; and
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery, based on an amount of power stored in the battery and a threshold.

2. The power receiving apparatus according to claim 1, wherein the power stored in the battery is power which is received by the power receiving unit and is stored in the battery.

3. The power receiving apparatus according to claim 1, further comprising:
a determination unit configured to determine that the state in which the communication unit performs wireless communication is to be switched,
wherein the switching unit switches, according to determination by the determination unit, the state in which the communication unit performs wireless communication.

4. The power receiving apparatus according to claim 1, wherein the switching unit switches the state so that the communication unit performs wireless communication using power received by the power receiving unit and not stored in the battery before the battery starts to store power, and the communication unit performs wireless communication using power stored in the battery after the battery starts to store power.

5. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery; and
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery, based on an amount of power stored in the battery and an amount of power by which the communication unit can perform wireless communication for the wireless power transmission.

6. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery; and
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery, based on an amount of power stored in the battery and an amount of power by which a predetermined application can operate.

7. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery;
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery, and
a determination unit configured to determine that the state in which the communication unit performs wireless communication is to be switched,
wherein the determination unit determines, in a case where a predetermined application starts to operate in the power receiving apparatus, that the state in which the communication unit performs wireless communication is to be switched, and
wherein the switching unit switches, according to determination by the determination unit, the state in which the communication unit performs wireless communication.

8. The power receiving apparatus according to claim 7, wherein the predetermined application uses the communication unit to perform wireless communication which is not for the wireless power transmission.

9. A control method for controlling a power receiving apparatus, the method comprising:
receiving power wirelessly transmitted by a power transmission apparatus;

switching a state in which a communication unit in the power receiving apparatus performs wireless communication to control power between a first state in which the communication unit performs wireless communication using power received in the receiving and not stored in a battery and a second state in which the communication unit performs wireless communication using power stored in the battery, based on an amount of power stored in the battery and a threshold; and performing wireless communication for controlling wireless power transmission from the power transmission apparatus by using either power received in the receiving and not stored in the battery or power stored in the battery.

10. A non-transitory computer readable storage medium storing computer executable instructions for causing a computer to execute a method, the method comprising:
receiving power wirelessly transmitted by a power transmission apparatus;
switching a state in which a communication unit in the power receiving apparatus performs wireless communication to control power between a first state in which the communication unit performs wireless communication using power received in the receiving and not stored in a battery and a second state in which the communication unit performs wireless communication using power stored in the battery, based on an amount of power stored in the battery and a threshold; and
performing wireless communication for controlling wireless power transmission from the power transmission apparatus by using either power received in the receiving and not stored in the battery or power stored in the battery.

11. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery;
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery, and
a determination unit configured to determine that the state in which the communication unit performs wireless communication is to be switched from the first state in which the communication unit performs wireless communication using power received by the power receiving unit and not stored in a battery to the second state in which the communication unit performs wireless communication using power stored in the battery,
wherein the switching unit switches, according to determination by the determination unit, the state in which the communication unit performs wireless communication, and
wherein in a case where the determination unit determines that the state in which the communication unit performs wireless communication is to be switched, the communication unit transmits a notification regarding termination of a connection used for wireless communication for the wireless power transmission, before the state in which the communication unit performs wireless communication is switched by the switching unit.

12. The power receiving apparatus according to claim 11, wherein the determination unit determines, based on an amount of power stored in the battery, that the state in which the communication unit performs wireless communication is to be switched.

13. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery; and
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery,
wherein before the state in which the communication unit performs wireless communication is switched by the switching unit, the communication unit transmits, to the power transmission apparatus, a notification regarding termination of a connection used for wireless communication for the wireless power transmission, and
wherein after the state in which the communication unit performs wireless communication is switched by the switching unit, the communication unit performs wireless communication to establish a new connection used for wireless communication for the wireless power transmission.

14. The power receiving apparatus according to claim 13, wherein the switching unit switches the state in which the communication unit performs wireless communication, by switching a supply path for supplying power to the communication unit between a first supply path for supplying power received by the power receiving unit and not stored in the battery to the communication unit and a second supply path for supplying power stored in the battery to the communication unit.

15. The power receiving apparatus according to claim 13, further comprising:
a determination unit configured to determine that the state in which the communication unit performs wireless communication is to be switched,
wherein the switching unit switches, according to determination by the determination unit, the state in which the communication unit performs wireless communication, and
wherein in a case where the determination unit determines that the state in which the communication unit performs the wireless communication is to be switched, the communication unit transmits the notification before the state in which the communication unit performs wireless communication is switched by the switching unit.

16. The power receiving apparatus according to claim 15, wherein the determination unit determines, in a case where the amount of power stored in the battery has increased from an amount less than a predetermined amount of power to an amount greater than the predetermined amount of power, that the state in which the communication unit performs wireless communication is to be switched.

17. The power receiving apparatus according to claim 13, wherein the connection used for wireless communication for the wireless power transmission is a connection of Bluetooth Low Energy.

18. The power receiving apparatus according to claim 17, wherein the communication unit performs wireless communication to establish the new connection by transmitting an advertising packet defined in a standard of Bluetooth Low Energy.

19. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery; and
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery,
wherein the communication unit is further configured to perform wireless communication with an apparatus different from the power transmission apparatus.

20. A power receiving apparatus comprising:
a power receiving unit configured to receive power wirelessly transmitted by a power transmission apparatus;
a battery configured to store at least a part of power received by the power receiving unit;
a communication unit configured to perform wireless communication for controlling wireless power transmission from the power transmission apparatus to the power receiving unit by using either power received by the power receiving unit and not stored in the battery or power stored in the battery; and
a switching unit configured to switch a state in which the communication unit performs wireless communication between a first state in which the communication unit performs wireless communication using power received by the power receiving unit and not stored in the battery and a second state in which the communication unit performs wireless communication using power stored in the battery,
wherein the communication unit performs wireless communication by using power stored in the battery, in a case where an application other than wireless power transmission operate.

21. The power receiving apparatus according to claim 20, wherein the application uses the communication unit to perform wireless communication which is not for the wireless power transmission.

* * * * *